(12) United States Patent
Weber et al.

(10) Patent No.: US 8,125,461 B2
(45) Date of Patent: Feb. 28, 2012

(54) DYNAMIC INPUT GRAPHIC DISPLAY

(75) Inventors: Douglas Weber, Cupertino, CA (US);
Stephen P. Zadesky, Cupertino, CA
(US); Stanley C. Ng, Cupertino, CA
(US); Andrew B. Hodge, Cupertino, CA
(US)

(73) Assignee: Apple Inc., Cupertino, CA (US)

( * ) Notice: Subject to any disclaimer, the term of this patent is extended or adjusted under 35 U.S.C. 154(b) by 291 days.

(21) Appl. No.: 12/205,795

(22) Filed: Sep. 5, 2008

(65) Prior Publication Data
US 2009/0179854 A1 Jul. 16, 2009

Related U.S. Application Data

(60) Provisional application No. 61/020,531, filed on Jan. 11, 2008.

(51) Int. Cl.
*G06F 3/041* (2006.01)
(52) U.S. Cl. .......................... 345/173; 345/170
(58) Field of Classification Search ................ None
See application file for complete search history.

(56) References Cited

U.S. PATENT DOCUMENTS

| | | |
|---|---|---|
| 1,061,578 A | 5/1913 | Wischhusen et al. |
| 2,063,276 A | 12/1936 | Thomas |
| 2,798,907 A | 7/1957 | Schneider |
| 2,903,229 A | 9/1959 | Landge |
| 2,945,111 A | 7/1960 | McCormick |
| 3,005,055 A | 10/1961 | Mattke |
| 3,965,399 A | 6/1976 | Walker et al. |
| 3,996,441 A | 12/1976 | Ohashi |
| 4,029,915 A | 6/1977 | Ojima |
| 4,103,252 A | 7/1978 | Bobick |
| 4,110,749 A | 8/1978 | Janko et al. |
| 4,115,670 A | 9/1978 | Chandler |
| 4,121,204 A | 10/1978 | Welch et al. |
| 4,129,747 A | 12/1978 | Pepper |
| 4,158,216 A | 6/1979 | Bigelow |
| 4,242,676 A | 12/1980 | Piguet et al. |
| 4,246,452 A | 1/1981 | Chandler |
| 4,264,903 A | 4/1981 | Bigelow |
| 4,266,144 A | 5/1981 | Bristol |

(Continued)

FOREIGN PATENT DOCUMENTS

CN 1139235 1/1997

(Continued)

OTHER PUBLICATIONS

Ng et al., U.S. Office Action mailed Jul. 8, 2010, directed to U.S. Appl. No. 11/882,423; 19 pages.

(Continued)

*Primary Examiner* — Amare Mengistu
*Assistant Examiner* — Antonio Xavier
(74) *Attorney, Agent, or Firm* — Morrison & Foerster LLP

(57) ABSTRACT

An input device for providing dynamic displays is disclosed. The input device can modify the appearance and/or location of graphics associated with an input area of a device. For example, the input device can have a button layout that shifts based on the orientation of the electronic device relative to the user, such that the button layout is consistently presented to the user in an upright orientation. The input device can rotate and/or rename a button input area region depending on the context of an application running on the electronic device. The input device can display dynamic graphic content in an input area which is distinct from a display screen of the electronic device.

20 Claims, 19 Drawing Sheets

U.S. PATENT DOCUMENTS

| | | | |
|---|---|---|---|
| 4,293,734 A | 10/1981 | Pepper, Jr. | |
| D264,969 S | 6/1982 | McGoutry | |
| 4,338,502 A | 7/1982 | Hashimoto et al. | |
| 4,380,007 A | 4/1983 | Steinegger | |
| 4,380,040 A | 4/1983 | Posset | |
| 4,394,649 A | 7/1983 | Suchoff et al. | |
| 4,475,008 A | 10/1984 | Doi et al. | |
| 4,570,149 A | 2/1986 | Thornburg et al. | |
| 4,583,161 A | 4/1986 | Gunderson et al. | |
| 4,587,378 A | 5/1986 | Moore | |
| 4,604,786 A | 8/1986 | Howie, Jr. | |
| 4,613,736 A | 9/1986 | Shichijo et al. | |
| 4,644,100 A | 2/1987 | Brenner et al. | |
| 4,719,524 A | 1/1988 | Morishima et al. | |
| 4,734,034 A | 3/1988 | Maness et al. | |
| 4,736,191 A | 4/1988 | Matzke et al. | |
| 4,739,191 A | 4/1988 | Puar | |
| 4,739,299 A | 4/1988 | Eventoff et al. | |
| 4,752,655 A | 6/1988 | Tajiri et al. | |
| 4,755,765 A | 7/1988 | Ferland | |
| 4,764,717 A | 8/1988 | Tucker et al. | |
| 4,771,139 A | 9/1988 | DeSmet | |
| 4,798,919 A | 1/1989 | Miessler et al. | |
| 4,810,992 A | 3/1989 | Eventoff | |
| 4,822,957 A | 4/1989 | Talmage, Jr. et al. | |
| 4,831,359 A | 5/1989 | Newell | |
| 4,849,852 A | 7/1989 | Mullins | |
| 4,856,993 A | 8/1989 | Maness et al. | |
| 4,860,768 A | 8/1989 | Hon et al. | |
| 4,866,602 A | 9/1989 | Hall | |
| 4,876,524 A | 10/1989 | Jenkins | |
| 4,897,511 A | 1/1990 | Itaya et al. | |
| 4,914,624 A | 4/1990 | Dunthorn | |
| 4,917,516 A | 4/1990 | Retter | |
| 4,943,889 A | 7/1990 | Ohmatoi | |
| 4,951,036 A | 8/1990 | Grueter et al. | |
| 4,954,823 A | 9/1990 | Binstead | |
| 4,976,435 A | 12/1990 | Shatford et al. | |
| 4,990,900 A | 2/1991 | Kikuchi | |
| 5,008,497 A | 4/1991 | Asher | |
| 5,036,321 A | 7/1991 | Leach et al. | |
| 5,053,757 A | 10/1991 | Meadows | |
| 5,086,870 A | 2/1992 | Bolduc | |
| 5,125,077 A | 6/1992 | Hall | |
| 5,159,159 A | 10/1992 | Asher | |
| 5,179,648 A | 1/1993 | Hauck | |
| 5,186,646 A | 2/1993 | Pederson | |
| 5,192,082 A | 3/1993 | Inoue et al. | |
| 5,193,669 A | 3/1993 | Demeo et al. | |
| 5,231,326 A | 7/1993 | Echols | |
| 5,237,311 A | 8/1993 | Mailey et al. | |
| 5,278,362 A | 1/1994 | Ohashi | |
| 5,305,017 A | 4/1994 | Gerpheide | |
| 5,313,027 A | 5/1994 | Inoue et al. | |
| D349,280 S | 8/1994 | Kaneko | |
| 5,339,213 A | 8/1994 | O'Callaghan | |
| 5,367,199 A | 11/1994 | Lefkowitz et al. | |
| 5,374,787 A | 12/1994 | Miller et al. | |
| 5,379,057 A | 1/1995 | Clough et al. | |
| 5,404,152 A | 4/1995 | Nagai | |
| 5,408,621 A | 4/1995 | Ben-Arie | |
| 5,414,445 A | 5/1995 | Kaneko et al. | |
| 5,416,498 A | 5/1995 | Grant | |
| 5,424,756 A | 6/1995 | Ho et al. | |
| 5,432,531 A | 7/1995 | Calder et al. | |
| 5,438,331 A | 8/1995 | Gilligan et al. | |
| D362,431 S | 9/1995 | Kaneko et al. | |
| 5,450,075 A | 9/1995 | Waddington | |
| 5,453,761 A | 9/1995 | Tanaka | |
| 5,473,343 A | 12/1995 | Kimmich et al. | |
| 5,473,344 A | 12/1995 | Bacon et al. | |
| 5,479,192 A | 12/1995 | Carroll, Jr. et al. | |
| 5,494,157 A | 2/1996 | Golenz et al. | |
| 5,495,566 A | 2/1996 | Kwatinetz | |
| 5,508,703 A | 4/1996 | Okamura et al. | |
| 5,508,717 A | 4/1996 | Miller | |
| 5,543,588 A | 8/1996 | Bisset et al. | |
| 5,543,591 A | 8/1996 | Gillespie et al. | |
| 5,555,004 A | 9/1996 | Ono et al. | |
| 5,559,301 A | 9/1996 | Bryan, Jr. et al. | |
| 5,559,943 A | 9/1996 | Cyr et al. | |
| 5,561,445 A | 10/1996 | Miwa et al. | |
| 5,564,112 A | 10/1996 | Hayes et al. | |
| 5,565,887 A | 10/1996 | McCambridge et al. | |
| 5,578,817 A | 11/1996 | Bidiville et al. | |
| 5,581,670 A | 12/1996 | Bier et al. | |
| 5,585,823 A | 12/1996 | Duchon et al. | |
| 5,589,856 A * | 12/1996 | Stein et al. | 345/173 |
| 5,589,893 A | 12/1996 | Gaughan et al. | |
| 5,596,347 A | 1/1997 | Robertson et al. | |
| 5,596,697 A | 1/1997 | Foster et al. | |
| 5,598,183 A | 1/1997 | Robertson et al. | |
| 5,611,040 A | 3/1997 | Brewer et al. | |
| 5,611,060 A | 3/1997 | Belfiore et al. | |
| 5,613,137 A | 3/1997 | Bertram et al. | |
| 5,617,114 A | 4/1997 | Bier et al. | |
| 5,627,531 A | 5/1997 | Posso et al. | |
| 5,632,679 A | 5/1997 | Tremmel | |
| 5,640,258 A | 6/1997 | Kurashima et al. | |
| 5,648,642 A | 7/1997 | Miller et al. | |
| D382,550 S | 8/1997 | Kaneko et al. | |
| 5,657,012 A | 8/1997 | Tait | |
| 5,661,632 A | 8/1997 | Register | |
| D385,542 S | 10/1997 | Kaneko et al. | |
| 5,675,362 A | 10/1997 | Clough et al. | |
| 5,689,285 A | 11/1997 | Asher | |
| 5,721,849 A | 2/1998 | Amro | |
| 5,726,687 A | 3/1998 | Belfiore et al. | |
| 5,729,219 A | 3/1998 | Armstrong et al. | |
| 5,730,165 A | 3/1998 | Philipp | |
| 5,748,185 A | 5/1998 | Stephan et al. | |
| 5,751,274 A | 5/1998 | Davis | |
| 5,754,890 A | 5/1998 | Holmdahl et al. | |
| 5,764,066 A | 6/1998 | Novak et al. | |
| 5,777,605 A | 7/1998 | Yoshinobu et al. | |
| 5,786,818 A | 7/1998 | Brewer et al. | |
| 5,790,769 A | 8/1998 | Buxton et al. | |
| 5,798,752 A | 8/1998 | Buxton et al. | |
| 5,805,144 A | 9/1998 | Scholder et al. | |
| 5,808,602 A | 9/1998 | Sellers | |
| 5,812,239 A | 9/1998 | Eger | |
| 5,812,498 A | 9/1998 | Terés | |
| 5,815,141 A | 9/1998 | Phares | |
| 5,825,351 A | 10/1998 | Tam | |
| 5,825,352 A | 10/1998 | Bisset et al. | |
| 5,825,353 A | 10/1998 | Will | |
| 5,828,364 A | 10/1998 | Siddiqui | |
| 5,838,304 A | 11/1998 | Hall | |
| 5,841,078 A | 11/1998 | Miller et al. | |
| 5,841,423 A | 11/1998 | Carroll, Jr. et al. | |
| D402,281 S | 12/1998 | Ledbetter et al. | |
| 5,850,213 A | 12/1998 | Imai et al. | |
| 5,856,645 A | 1/1999 | Norton | |
| 5,856,822 A | 1/1999 | Du et al. | |
| 5,859,629 A | 1/1999 | Tognazzini | |
| 5,861,875 A | 1/1999 | Gerpheide | |
| 5,869,791 A | 2/1999 | Young | |
| 5,875,311 A | 2/1999 | Bertram et al. | |
| 5,883,619 A | 3/1999 | Ho et al. | |
| 5,889,236 A | 3/1999 | Gillespie et al. | |
| 5,889,511 A | 3/1999 | Ong et al. | |
| 5,894,117 A | 4/1999 | Kamishima | |
| 5,903,229 A | 5/1999 | Kishi | |
| 5,907,152 A | 5/1999 | Dandliker et al. | |
| 5,907,318 A | 5/1999 | Medina | |
| 5,909,211 A | 6/1999 | Combs et al. | |
| 5,910,802 A | 6/1999 | Shields et al. | |
| 5,914,706 A | 6/1999 | Kono | |
| 5,923,388 A | 7/1999 | Kurashima et al. | |
| D412,940 S | 8/1999 | Kato et al. | |
| 5,933,102 A | 8/1999 | Miller et al. | |
| 5,933,141 A * | 8/1999 | Smith | 725/39 |
| 5,936,619 A * | 8/1999 | Nagasaki et al. | 345/205 |
| 5,943,044 A | 8/1999 | Martinelli et al. | |
| 5,953,000 A | 9/1999 | Weirich | |
| 5,956,019 A | 9/1999 | Bang et al. | |
| 5,959,610 A | 9/1999 | Silfvast | |

| Patent No. | Kind | Date | Inventor |
|---|---|---|---|
| 5,959,611 | A | 9/1999 | Smailagic et al. |
| 5,964,661 | A | 10/1999 | Dodge |
| 5,973,668 | A | 10/1999 | Watanabe |
| 6,000,000 | A | 12/1999 | Hawkins et al. |
| 6,002,093 | A | 12/1999 | Hrehor et al. |
| 6,002,389 | A | 12/1999 | Kasser |
| 6,005,299 | A | 12/1999 | Hengst |
| 6,025,832 | A | 2/2000 | Sudo et al. |
| 6,031,518 | A | 2/2000 | Adams et al. |
| 6,034,672 | A | 3/2000 | Gaultier et al. |
| 6,057,829 | A | 5/2000 | Silfvast |
| 6,075,533 | A | 6/2000 | Chang |
| 6,084,574 | A | 7/2000 | Bidiville |
| D430,169 | S | 8/2000 | Scibora |
| 6,097,372 | A | 8/2000 | Suzuki |
| 6,104,790 | A | 8/2000 | Narayanaswami |
| 6,122,526 | A | 9/2000 | Parulski et al. |
| 6,124,587 | A | 9/2000 | Bidiville et al. |
| 6,128,006 | A | 10/2000 | Rosenberg et al. |
| 6,131,048 | A | 10/2000 | Sudo et al. |
| 6,141,068 | A | 10/2000 | Iijima |
| 6,147,856 | A | 11/2000 | Karidis |
| 6,163,312 | A | 12/2000 | Furuya |
| 6,166,721 | A | 12/2000 | Kuroiwa et al. |
| 6,179,496 | B1 | 1/2001 | Chou |
| 6,181,322 | B1 | 1/2001 | Nanavati |
| D437,860 | S | 2/2001 | Suzuki et al. |
| 6,188,391 | B1 | 2/2001 | Seely et al. |
| 6,188,393 | B1 | 2/2001 | Shu |
| 6,191,774 | B1 | 2/2001 | Schena et al. |
| 6,198,054 | B1 | 3/2001 | Janniere |
| 6,198,473 | B1 | 3/2001 | Armstrong |
| 6,211,861 | B1 | 4/2001 | Rosenberg et al. |
| 6,219,038 | B1 | 4/2001 | Cho |
| 6,222,528 | B1 | 4/2001 | Gerpheide et al. |
| D442,592 | S | 5/2001 | Ledbetter et al. |
| 6,225,976 | B1 | 5/2001 | Yates et al. |
| 6,225,980 | B1 | 5/2001 | Weiss et al. |
| 6,226,534 | B1 | 5/2001 | Aizawa |
| 6,227,966 | B1 | 5/2001 | Yokoi |
| D443,616 | S | 6/2001 | Fisher et al. |
| 6,243,078 | B1 | 6/2001 | Rosenberg |
| 6,243,080 | B1 | 6/2001 | Molne |
| 6,243,646 | B1 | 6/2001 | Ozaki et al. |
| 6,248,017 | B1 | 6/2001 | Roach |
| 6,254,477 | B1 | 7/2001 | Sasaki et al. |
| 6,256,011 | B1 | 7/2001 | Culver |
| 6,259,491 | B1 | 7/2001 | Ekedahl et al. |
| 6,262,717 | B1 | 7/2001 | Donohue et al. |
| 6,262,785 | B1 | 7/2001 | Kim |
| 6,266,050 | B1 | 7/2001 | Oh et al. |
| 6,285,211 | B1 | 9/2001 | Sample et al. |
| D448,810 | S | 10/2001 | Goto |
| 6,297,795 | B1 | 10/2001 | Kato et al. |
| 6,297,811 | B1 | 10/2001 | Kent et al. |
| 6,300,946 | B1 | 10/2001 | Lincke et al. |
| 6,307,539 | B2 | 10/2001 | Suzuki |
| D450,713 | S | 11/2001 | Masamitsu et al. |
| 6,314,483 | B1 | 11/2001 | Goto et al. |
| 6,321,441 | B1 | 11/2001 | Davidson et al. |
| 6,323,845 | B1 | 11/2001 | Robbins |
| D452,250 | S | 12/2001 | Chan |
| 6,337,678 | B1 | 1/2002 | Fish |
| 6,340,800 | B1 | 1/2002 | Zhai et al. |
| D454,568 | S | 3/2002 | Andre et al. |
| 6,357,887 | B1 | 3/2002 | Novak |
| D455,793 | S | 4/2002 | Lin |
| 6,373,265 | B1 | 4/2002 | Morimoto et al. |
| 6,373,470 | B1 | 4/2002 | Andre et al. |
| 6,377,530 | B1 | 4/2002 | Burrows |
| 6,396,523 | B1 | 5/2002 | Segal et al. |
| 6,424,338 | B1 | 7/2002 | Anderson |
| 6,429,846 | B2 | 8/2002 | Rosenberg et al. |
| 6,429,852 | B1 | 8/2002 | Adams et al. |
| 6,452,514 | B1 | 9/2002 | Philipp |
| 6,465,271 | B1 | 10/2002 | Ko et al. |
| 6,473,069 | B1 | 10/2002 | Gerphelde |
| 6,492,602 | B2 | 12/2002 | Asai et al. |
| 6,492,979 | B1 | 12/2002 | Kent et al. |
| 6,496,181 | B1 | 12/2002 | Bomer et al. |
| 6,497,412 | B1 | 12/2002 | Bramm |
| D468,365 | S | 1/2003 | Bransky et al. |
| D469,109 | S | 1/2003 | Andre et al. |
| D472,245 | S | 3/2003 | Andre et al. |
| 6,546,231 | B1 | 4/2003 | Someya et al. |
| 6,563,487 | B1 | 5/2003 | Martin et al. |
| 6,587,091 | B2 | 7/2003 | Serpa |
| 6,606,244 | B1 | 8/2003 | Liu et al. |
| 6,618,909 | B1 | 9/2003 | Yang |
| 6,636,197 | B1 | 10/2003 | Goldenberg et al. |
| 6,639,584 | B1 | 10/2003 | Li |
| 6,640,250 | B1 | 10/2003 | Chang et al. |
| 6,650,975 | B2 | 11/2003 | Ruffner |
| D483,809 | S | 12/2003 | Lim |
| 6,658,773 | B2 | 12/2003 | Rohne et al. |
| 6,664,951 | B1 | 12/2003 | Fujii et al. |
| 6,677,927 | B1 | 1/2004 | Bruck et al. |
| 6,678,891 | B1 | 1/2004 | Wilcox et al. |
| 6,686,904 | B1 | 2/2004 | Sherman et al. |
| 6,686,906 | B2 | 2/2004 | Salminen et al. |
| 6,703,550 | B2 | 3/2004 | Chu |
| 6,724,817 | B1 | 4/2004 | Simpson et al. |
| 6,727,889 | B2 | 4/2004 | Shaw |
| D489,731 | S | 5/2004 | Huang |
| 6,738,045 | B2 | 5/2004 | Hinckley et al. |
| 6,750,803 | B2 | 6/2004 | Yates et al. |
| 6,753,830 | B2 * | 6/2004 | Gelbman ........................ 345/55 |
| 6,781,576 | B2 | 8/2004 | Tamura |
| 6,784,384 | B2 | 8/2004 | Park et al. |
| 6,788,288 | B2 | 9/2004 | Ano |
| 6,791,533 | B2 | 9/2004 | Su |
| 6,795,057 | B2 | 9/2004 | Gordon |
| D497,618 | S | 10/2004 | Andre et al. |
| 6,810,271 | B1 | 10/2004 | Wood et al. |
| 6,822,640 | B2 | 11/2004 | Derocher |
| 6,834,975 | B2 | 12/2004 | Chu-Chia et al. |
| 6,844,872 | B1 | 1/2005 | Farag et al. |
| 6,855,899 | B2 | 2/2005 | Sotome |
| 6,865,718 | B2 | 3/2005 | Levi Montalcini |
| 6,886,842 | B2 | 5/2005 | Vey et al. |
| 6,894,916 | B2 | 5/2005 | Reohr et al. |
| D506,476 | S | 6/2005 | Andre et al. |
| 6,922,189 | B2 | 7/2005 | Fujiyoshi |
| 6,930,494 | B2 | 8/2005 | Tesdahl et al. |
| 6,958,614 | B2 | 10/2005 | Morimoto |
| 6,977,808 | B2 | 12/2005 | Lam et al. |
| 6,978,127 | B1 | 12/2005 | Bulthuis et al. |
| 6,985,137 | B2 | 1/2006 | Kaikuranta |
| 7,006,077 | B1 | 2/2006 | Uusimäki |
| 7,019,225 | B2 | 3/2006 | Matsumoto et al. |
| 7,046,230 | B2 | 5/2006 | Zadesky et al. |
| 7,050,292 | B2 | 5/2006 | Shimura et al. |
| 7,069,044 | B2 | 6/2006 | Okada et al. |
| 7,078,633 | B2 | 7/2006 | Ihalainen |
| 7,084,856 | B2 | 8/2006 | Huppi |
| 7,113,196 | B2 | 9/2006 | Kerr |
| 7,117,136 | B1 | 10/2006 | Rosedale |
| 7,119,792 | B1 | 10/2006 | Andre et al. |
| 7,215,319 | B2 | 5/2007 | Kamijo et al. |
| 7,233,318 | B1 | 6/2007 | Farag et al. |
| 7,236,154 | B1 | 6/2007 | Kerr et al. |
| 7,236,159 | B1 | 6/2007 | Siversson |
| 7,253,643 | B1 | 8/2007 | Seguine |
| 7,279,647 | B2 | 10/2007 | Philipp |
| 7,288,732 | B2 | 10/2007 | Hashida |
| 7,297,883 | B2 | 11/2007 | Rochon et al. |
| 7,310,089 | B2 | 12/2007 | Baker et al. |
| 7,312,785 | B2 | 12/2007 | Tsuk et al. |
| 7,321,103 | B2 | 1/2008 | Nakanishi et al. |
| 7,333,092 | B2 | 2/2008 | Zadesky et al. |
| 7,348,898 | B2 | 3/2008 | Ono |
| 7,382,139 | B2 | 6/2008 | Mackey |
| 7,394,038 | B2 | 7/2008 | Chang |
| 7,395,081 | B2 | 7/2008 | Bonnelykke Kristensen et al. |
| 7,397,467 | B2 | 7/2008 | Park et al. |
| 7,439,963 | B2 | 10/2008 | Geaghan et al. |
| 7,466,307 | B2 | 12/2008 | Trent et al. |
| 7,479,949 | B2 | 1/2009 | Jobs et al. |

| Patent/Publication | Date | Name |
|---|---|---|
| 7,486,323 B2 * | 2/2009 | Lee et al. .................. 348/333.12 |
| 7,502,016 B2 | 3/2009 | Trent, Jr. et al. |
| 7,503,193 B2 | 3/2009 | Schoene et al. |
| 7,593,782 B2 | 9/2009 | Jobs et al. |
| 7,645,955 B2 | 1/2010 | Huang et al. |
| 7,671,837 B2 | 3/2010 | Forsblad et al. |
| 7,708,051 B2 | 5/2010 | Katsumi et al. |
| 7,772,507 B2 | 8/2010 | Orr et al. |
| 2001/0011991 A1 | 8/2001 | Wang et al. |
| 2001/0011993 A1 * | 8/2001 | Saarinen ...................... 345/156 |
| 2001/0033270 A1 | 10/2001 | Osawa et al. |
| 2001/0043545 A1 | 11/2001 | Aratani |
| 2001/0050673 A1 | 12/2001 | Davenport |
| 2001/0051046 A1 | 12/2001 | Watanabe et al. |
| 2002/0000978 A1 | 1/2002 | Gerpheide |
| 2002/0011993 A1 | 1/2002 | Lui et al. |
| 2002/0027547 A1 | 3/2002 | Kamijo et al. |
| 2002/0030665 A1 | 3/2002 | Ano |
| 2002/0033848 A1 | 3/2002 | Sciammarella et al. |
| 2002/0039493 A1 | 4/2002 | Tanaka |
| 2002/0045960 A1 | 4/2002 | Phillips et al. |
| 2002/0071550 A1 | 6/2002 | Pletikosa |
| 2002/0089545 A1 | 7/2002 | Levi Montalcini |
| 2002/0103796 A1 | 8/2002 | Hartley |
| 2002/0118131 A1 | 8/2002 | Yates et al. |
| 2002/0118169 A1 | 8/2002 | Hinckley et al. |
| 2002/0145594 A1 | 10/2002 | Derocher |
| 2002/0154090 A1 | 10/2002 | Lin |
| 2002/0158844 A1 | 10/2002 | McLoone et al. |
| 2002/0164156 A1 | 11/2002 | Bilbrey |
| 2002/0168947 A1 | 11/2002 | Lemley |
| 2002/0180701 A1 | 12/2002 | Hayama et al. |
| 2002/0196239 A1 | 12/2002 | Lee |
| 2003/0002246 A1 | 1/2003 | Kerr |
| 2003/0025679 A1 | 2/2003 | Taylor et al. |
| 2003/0028346 A1 | 2/2003 | Sinclair et al. |
| 2003/0043121 A1 | 3/2003 | Chen |
| 2003/0043174 A1 | 3/2003 | Hinckley et al. |
| 2003/0050092 A1 | 3/2003 | Yun |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0091377 A1 | 5/2003 | Hsu et al. |
| 2003/0095095 A1 | 5/2003 | Pihlaja |
| 2003/0095096 A1 | 5/2003 | Robbin et al. |
| 2003/0098851 A1 | 5/2003 | Brink |
| 2003/0103043 A1 | 6/2003 | Mulligan et al. |
| 2003/0122792 A1 | 7/2003 | Yamamoto et al. |
| 2003/0135292 A1 | 7/2003 | Husgafvel et al. |
| 2003/0142081 A1 | 7/2003 | Iizuka et al. |
| 2003/0184517 A1 | 10/2003 | Senzui et al. |
| 2003/0197740 A1 | 10/2003 | Reponen |
| 2003/0206202 A1 | 11/2003 | Moriya |
| 2003/0210537 A1 | 11/2003 | Engelmann |
| 2003/0224831 A1 * | 12/2003 | Engstrom et al. .............. 455/566 |
| 2004/0027341 A1 | 2/2004 | Derocher |
| 2004/0074756 A1 | 4/2004 | Kawakami et al. |
| 2004/0080682 A1 | 4/2004 | Dalton |
| 2004/0109357 A1 | 6/2004 | Cernea et al. |
| 2004/0150619 A1 | 8/2004 | Baudisch et al. |
| 2004/0156192 A1 | 8/2004 | Kerr et al. |
| 2004/0178997 A1 | 9/2004 | Gillespie et al. |
| 2004/0200699 A1 | 10/2004 | Matsumoto et al. |
| 2004/0215986 A1 | 10/2004 | Shakkarwar |
| 2004/0224638 A1 | 11/2004 | Fadell et al. |
| 2004/0239622 A1 | 12/2004 | Proctor et al. |
| 2004/0252109 A1 | 12/2004 | Trent, Jr. et al. |
| 2004/0252867 A1 | 12/2004 | Lan et al. |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0012644 A1 | 1/2005 | Hurst et al. |
| 2005/0017957 A1 | 1/2005 | Yi |
| 2005/0024340 A1 * | 2/2005 | Bathiche ...................... 345/170 |
| 2005/0024341 A1 | 2/2005 | Gillespie et al. |
| 2005/0030048 A1 | 2/2005 | Bolender |
| 2005/0052425 A1 * | 3/2005 | Zadesky et al. ............... 345/173 |
| 2005/0052426 A1 | 3/2005 | Hagermoser et al. |
| 2005/0052429 A1 | 3/2005 | Philipp |
| 2005/0068304 A1 * | 3/2005 | Lewis et al. .................. 345/168 |
| 2005/0083299 A1 | 4/2005 | Nagasaka |
| 2005/0083307 A1 | 4/2005 | Aufderheide |
| 2005/0090288 A1 * | 4/2005 | Stohr et al. .................. 455/566 |
| 2005/0104867 A1 | 5/2005 | Westerman et al. |
| 2005/0110768 A1 | 5/2005 | Marriott et al. |
| 2005/0129199 A1 | 6/2005 | Abe |
| 2005/0139460 A1 | 6/2005 | Hosaka |
| 2005/0140657 A1 | 6/2005 | Park et al. |
| 2005/0143124 A1 * | 6/2005 | Kennedy et al. ........... 455/556.1 |
| 2005/0156881 A1 | 7/2005 | Trent et al. |
| 2005/0162402 A1 | 7/2005 | Watanachote |
| 2005/0204309 A1 | 9/2005 | Szeto |
| 2005/0237308 A1 | 10/2005 | Autio et al. |
| 2006/0016884 A1 * | 1/2006 | Block et al. .................. 235/381 |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0032680 A1 | 2/2006 | Elias et al. |
| 2006/0038791 A1 | 2/2006 | Mackey |
| 2006/0066582 A1 | 3/2006 | Lyon et al. |
| 2006/0066588 A1 | 3/2006 | Lyon et al. |
| 2006/0095848 A1 | 5/2006 | Naik |
| 2006/0097991 A1 | 5/2006 | Hotelling et al. |
| 2006/0131156 A1 | 6/2006 | Voelckers |
| 2006/0143574 A1 | 6/2006 | Ito et al. |
| 2006/0174568 A1 | 8/2006 | Kinoshita et al. |
| 2006/0181517 A1 | 8/2006 | Zadesky et al. |
| 2006/0197750 A1 | 9/2006 | Kerr et al. |
| 2006/0232557 A1 | 10/2006 | Fallot-Burghardt |
| 2006/0236262 A1 | 10/2006 | Bathiche et al. |
| 2006/0250377 A1 | 11/2006 | Zadesky et al. |
| 2006/0274042 A1 | 12/2006 | Krah et al. |
| 2006/0274905 A1 | 12/2006 | Lindahl et al. |
| 2006/0279896 A1 | 12/2006 | Bruwer |
| 2006/0284836 A1 | 12/2006 | Philipp |
| 2007/0013671 A1 | 1/2007 | Zadesky et al. |
| 2007/0018970 A1 | 1/2007 | Tabasso et al. |
| 2007/0052044 A1 | 3/2007 | Forsblad et al. |
| 2007/0052691 A1 | 3/2007 | Zadesky et al. |
| 2007/0080936 A1 | 4/2007 | Tsuk et al. |
| 2007/0080938 A1 | 4/2007 | Robbin et al. |
| 2007/0080952 A1 | 4/2007 | Lynch et al. |
| 2007/0083822 A1 | 4/2007 | Robbin et al. |
| 2007/0085841 A1 | 4/2007 | Tsuk et al. |
| 2007/0097086 A1 | 5/2007 | Battles et al. |
| 2007/0120834 A1 | 5/2007 | Boillot |
| 2007/0126696 A1 | 6/2007 | Boillot |
| 2007/0152975 A1 | 7/2007 | Ogihara |
| 2007/0152977 A1 * | 7/2007 | Ng et al. ...................... 345/173 |
| 2007/0152983 A1 * | 7/2007 | McKillop et al. ............. 345/173 |
| 2007/0155434 A1 | 7/2007 | Jobs et al. |
| 2007/0157089 A1 * | 7/2007 | Van Os et al. ................. 715/702 |
| 2007/0242057 A1 | 10/2007 | Zadesky et al. |
| 2007/0247421 A1 | 10/2007 | Orsley et al. |
| 2007/0247443 A1 | 10/2007 | Philipp |
| 2007/0271516 A1 | 11/2007 | Carmichael |
| 2007/0273671 A1 | 11/2007 | Zadesky et al. |
| 2007/0276525 A1 | 11/2007 | Zadesky et al. |
| 2007/0279394 A1 | 12/2007 | Lampell |
| 2007/0285361 A1 * | 12/2007 | Jovanovich .................... 345/87 |
| 2007/0285404 A1 | 12/2007 | Rimon et al. |
| 2007/0290990 A1 | 12/2007 | Robbin et al. |
| 2007/0291016 A1 | 12/2007 | Philipp |
| 2007/0296709 A1 | 12/2007 | GuangHai |
| 2008/0006453 A1 * | 1/2008 | Hotelling ................... 178/18.06 |
| 2008/0006454 A1 | 1/2008 | Hotelling |
| 2008/0007533 A1 * | 1/2008 | Hotelling ...................... 345/173 |
| 2008/0007539 A1 | 1/2008 | Hotelling et al. |
| 2008/0012837 A1 | 1/2008 | Marriott et al. |
| 2008/0018615 A1 | 1/2008 | Zadesky et al. |
| 2008/0018616 A1 | 1/2008 | Lampell et al. |
| 2008/0018617 A1 | 1/2008 | Ng et al. |
| 2008/0036473 A1 | 2/2008 | Jansson |
| 2008/0036734 A1 | 2/2008 | Forsblad et al. |
| 2008/0060925 A1 | 3/2008 | Weber et al. |
| 2008/0062141 A1 | 3/2008 | Chandhri |
| 2008/0069412 A1 | 3/2008 | Champagne et al. |
| 2008/0079699 A1 | 4/2008 | Mackey |

| | | | | | | |
|---|---|---|---|---|---|---|
| 2008/0087476 A1 | 4/2008 | Prest | | EP | 1 841 188 | 10/2007 |
| 2008/0088582 A1 | 4/2008 | Prest | | EP | 1850218 | 10/2007 |
| 2008/0088596 A1 | 4/2008 | Prest | | EP | 1 876 711 | 1/2008 |
| 2008/0088597 A1 | 4/2008 | Prest | | FR | 2 686 440 | 7/1993 |
| 2008/0088600 A1 | 4/2008 | Prest | | GB | 2015167 | 9/1979 |
| 2008/0094352 A1 | 4/2008 | Tsuk et al. | | GB | 2072389 | 9/1981 |
| 2008/0098330 A1 | 4/2008 | Tsuk et al. | | GB | 2315186 | 1/1998 |
| 2008/0110739 A1 | 5/2008 | Peng et al. | | GB | 2333215 | 7/1999 |
| 2008/0111795 A1 | 5/2008 | Bollinger | | GB | 2391060 | 1/2004 |
| 2008/0143681 A1 | 6/2008 | XiaoPing | | GB | 2 402 105 | 12/2004 |
| 2008/0158145 A1 | 7/2008 | Westerman | | JP | 57-95722 | 6/1982 |
| 2008/0165152 A1 | 7/2008 | Forstall et al. | | JP | 57-97626 | 6/1982 |
| 2008/0165158 A1 | 7/2008 | Hotelling et al. | | JP | 61-117619 | 6/1986 |
| 2008/0196945 A1 | 8/2008 | Konstas | | JP | 61-124009 | 6/1986 |
| 2008/0202824 A1 | 8/2008 | Philipp et al. | | JP | 63-20411 | 1/1988 |
| 2008/0209442 A1* | 8/2008 | Setlur et al. .................. 719/318 | | JP | 63-106826 | 5/1988 |
| 2008/0264767 A1 | 10/2008 | Chen et al. | | JP | 63-181022 | 7/1988 |
| 2008/0280651 A1* | 11/2008 | Duarte .......................... 455/566 | | JP | 63-298518 | 12/1988 |
| 2008/0284742 A1 | 11/2008 | Prest | | JP | 03-57617 | 6/1991 |
| 2008/0293274 A1 | 11/2008 | Milan | | JP | 3-192418 | 8/1991 |
| 2009/0021267 A1 | 1/2009 | Golovchenko et al. | | JP | 04-32920 | 2/1992 |
| 2009/0026558 A1 | 1/2009 | Bauer et al. | | JP | 4-205408 | 7/1992 |
| 2009/0033635 A1 | 2/2009 | Wai | | JP | 5-041135 | 2/1993 |
| 2009/0036176 A1 | 2/2009 | Ure | | JP | 5-080938 | 4/1993 |
| 2009/0058687 A1 | 3/2009 | Rothkopf et al. | | JP | 5-101741 | 4/1993 |
| 2009/0058801 A1 | 3/2009 | Bull | | JP | 5-36623 | 5/1993 |
| 2009/0058802 A1 | 3/2009 | Orsley et al. | | JP | 5-189110 | 7/1993 |
| 2009/0073130 A1 | 3/2009 | Weber et al. | | JP | 5-205565 | 8/1993 |
| 2009/0078551 A1 | 3/2009 | Kang | | JP | 5-211021 | 8/1993 |
| 2009/0109181 A1 | 4/2009 | Hui et al. | | JP | 5-217464 | 8/1993 |
| 2009/0141046 A1 | 6/2009 | Rathnam et al. | | JP | 5-233141 | 9/1993 |
| 2009/0160771 A1 | 6/2009 | Hinckley et al. | | JP | 5-262276 | 10/1993 |
| 2009/0197059 A1 | 8/2009 | Weber et al. | | JP | 5-265656 | 10/1993 |
| 2009/0229892 A1 | 9/2009 | Fisher et al. | | JP | 5-274956 | 10/1993 |
| 2009/0273573 A1 | 11/2009 | Hotelling | | JP | 5-289811 | 11/1993 |
| 2010/0058251 A1 | 3/2010 | Rottler et al. | | JP | 5-298955 | 11/1993 |
| 2010/0060568 A1 | 3/2010 | Fisher et al. | | JP | 5-325723 | 12/1993 |
| 2010/0073319 A1 | 3/2010 | Lyon et al. | | JP | 6-20570 | 1/1994 |
| 2010/0149127 A1 | 6/2010 | Fisher et al. | | JP | 6-084428 | 3/1994 |
| 2010/0289759 A1 | 11/2010 | Fisher et al. | | JP | 6-089636 | 3/1994 |
| 2010/0313409 A1 | 12/2010 | Weber et al. | | JP | 6-96639 | 4/1994 |
| 2011/0005845 A1 | 1/2011 | Hotelling et al. | | JP | 6-111695 | 4/1994 |
| | | | | JP | 6-139879 | 5/1994 |
| FOREIGN PATENT DOCUMENTS | | | | JP | 6-187078 | 7/1994 |
| | | | | JP | 6-208433 | 7/1994 |
| CN | 1455615 | 11/2003 | | JP | 6-267382 | 9/1994 |
| CN | 1499356 | 5/2004 | | JP | 6-283993 | 10/1994 |
| CN | 1659506 | 8/2005 | | JP | 6-333459 | 12/1994 |
| DE | 3615742 | 11/1987 | | JP | 7-107574 | 4/1995 |
| DE | 19722636 | 12/1998 | | JP | 7-41882 | 7/1995 |
| DE | 10022537 | 11/2000 | | JP | 7-201249 | 8/1995 |
| DE | 20019074 U1 | 2/2001 | | JP | 7-201256 | 8/1995 |
| DE | 10 2004 043 663 | 4/2006 | | JP | 7-253838 | 10/1995 |
| EP | 0178157 | 4/1986 | | JP | 7-261899 | 10/1995 |
| EP | 0419145 A1 | 3/1991 | | JP | 7-261922 | 10/1995 |
| EP | 0 498 540 | 8/1992 | | JP | 7-296670 | 11/1995 |
| EP | 0 521 683 | 1/1993 | | JP | 7-319001 | 12/1995 |
| EP | 0 674 288 | 9/1995 | | JP | 8-016292 | 1/1996 |
| EP | 0 731 407 | 9/1996 | | JP | 8-115158 | 5/1996 |
| EP | 0 551 778 B1 | 1/1997 | | JP | 8-203387 | 8/1996 |
| EP | 0 880 091 A2 | 11/1998 | | JP | 8-293226 | 11/1996 |
| EP | 1 026 713 | 8/2000 | | JP | 8-298045 | 11/1996 |
| EP | 1 081 922 A2 | 3/2001 | | JP | 8-299541 | 11/1996 |
| EP | 1 098 241 A2 | 5/2001 | | JP | 8-316664 | 11/1996 |
| EP | 1 133 057 | 9/2001 | | JP | 9-044289 | 2/1997 |
| EP | 1 162 826 A2 | 12/2001 | | JP | 9-069023 | 3/1997 |
| EP | 1 168 396 | 1/2002 | | JP | 9-128148 | 5/1997 |
| EP | 1 205 836 A2 | 5/2002 | | JP | 9-134248 | 5/1997 |
| EP | 1 244 053 | 9/2002 | | JP | 9-218747 | 8/1997 |
| EP | 1 251 455 A2 | 10/2002 | | JP | 9-230993 | 9/1997 |
| EP | 1263193 | 12/2002 | | JP | 9-231858 | 9/1997 |
| EP | 1347481 | 9/2003 | | JP | 9-233161 | 9/1997 |
| EP | 1376326 | 1/2004 | | JP | 9-251347 | 9/1997 |
| EP | 1 467 392 | 10/2004 | | JP | 9-258895 | 10/1997 |
| EP | 1 482 401 | 12/2004 | | JP | 9-288926 | 11/1997 |
| EP | 1 496 467 | 1/2005 | | JP | 9-512979 | 12/1997 |
| EP | 1 517 228 | 3/2005 | | JP | 10-63467 | 3/1998 |
| EP | 1 542 437 A2 | 6/2005 | | JP | 10-74127 | 3/1998 |
| EP | 1 589 407 | 10/2005 | | JP | 10-074429 | 3/1998 |
| EP | 1 784 058 A2 | 5/2007 | | | | |

| | | |
|---|---|---|
| JP | 10-198507 | 7/1998 |
| JP | 10-227878 | 8/1998 |
| JP | 10-240693 | 9/1998 |
| JP | 10-320322 | 12/1998 |
| JP | 10-326149 | 12/1998 |
| JP | 11-24834 | 1/1999 |
| JP | 11-184607 | 7/1999 |
| JP | 11-194863 | 7/1999 |
| JP | 11-194872 | 7/1999 |
| JP | 11-194882 | 7/1999 |
| JP | 11-194883 | 7/1999 |
| JP | 11-194891 | 7/1999 |
| JP | 11-195353 | 7/1999 |
| JP | 11-203045 | 7/1999 |
| JP | 11-212725 | 8/1999 |
| JP | 11-272378 | 10/1999 |
| JP | 11-338628 | 12/1999 |
| JP | 2000-200147 | 7/2000 |
| JP | 2000-215549 | 8/2000 |
| JP | 2000-267777 | 9/2000 |
| JP | 2000-267786 | 9/2000 |
| JP | 2000-267797 | 9/2000 |
| JP | 2000-353045 | 12/2000 |
| JP | 2001-11769 | 1/2001 |
| JP | 2001-22508 | 1/2001 |
| JP | 2001-184158 | 7/2001 |
| JP | 3085481 | 2/2002 |
| JP | 2002-215311 | 8/2002 |
| JP | 2003-015796 | 1/2003 |
| JP | 2003-060754 | 2/2003 |
| JP | 2003-099198 | 4/2003 |
| JP | 2003-150303 | 5/2003 |
| JP | 2003-517674 | 5/2003 |
| JP | 2003-280799 | 10/2003 |
| JP | 2003-280807 | 10/2003 |
| JP | 2004-362097 | 12/2004 |
| JP | 2005-251218 | 9/2005 |
| JP | 2005-285140 | 10/2005 |
| JP | 2005-293606 | 10/2005 |
| JP | 2006-004453 | 1/2006 |
| JP | 2006-178962 | 7/2006 |
| JP | 3852854 | 12/2006 |
| JP | 2007-123473 | 5/2007 |
| KR | 1998-71394 | 10/1998 |
| KR | 1999-50198 | 7/1999 |
| KR | 2000-0008579 | 2/2000 |
| KR | 2001-0052016 | 6/2001 |
| KR | 2001-108361 | 12/2001 |
| KR | 2002-65059 | 8/2002 |
| KR | 10-2006-0021678 | 3/2006 |
| TW | 431607 | 4/2001 |
| TW | 00470193 | 12/2001 |
| TW | 547716 | 8/2003 |
| TW | I220491 | 8/2004 |
| WO | WO-94/17494 | 8/1994 |
| WO | WO-95/00897 A1 | 1/1995 |
| WO | WO-96/27968 | 9/1996 |
| WO | WO 98/14863 | 4/1998 |
| WO | WO-99/49443 | 9/1999 |
| WO | WO-00/79772 | 12/2000 |
| WO | WO-01/02949 | 1/2001 |
| WO | WO-01/44912 | 6/2001 |
| WO | WO-02/08881 | 1/2002 |
| WO | WO-03/044645 | 5/2003 |
| WO | WO 03/044956 | 5/2003 |
| WO | WO-03/025960 | 9/2003 |
| WO | WO 03/088176 | 10/2003 |
| WO | WO 03/090008 | 10/2003 |
| WO | WO-04/001573 | 12/2003 |
| WO | WO 2004/040606 | 5/2004 |
| WO | WO-2004/091956 | 10/2004 |
| WO | WO-2005/055620 | 6/2005 |
| WO | WO 2005/076117 | 8/2005 |
| WO | WO-2005/114369 | 12/2005 |
| WO | WO 2005/124526 | 12/2005 |
| WO | WO-2006/020305 | 2/2006 |
| WO | WO-2006/021211 A2 | 3/2006 |
| WO | WO 2006/037545 | 4/2006 |
| WO | WO 2006/104745 | 10/2006 |
| WO | WO-2006/135127 | 12/2006 |
| WO | WO 2007/025858 | 3/2007 |
| WO | WO-2007/078477 | 7/2007 |
| WO | WO-2007/084467 | 7/2007 |
| WO | WO-2007/089766 | 8/2007 |
| WO | WO-2008/007372 | 1/2008 |
| WO | WO-2008/045414 | 4/2008 |
| WO | WO-2008/045833 | 4/2008 |

OTHER PUBLICATIONS

Lynch et al., U.S. Office Action mailed Oct. 5, 2009, directed to U.S. Appl. No. 11/499,360; 7 pages.

Lynch et al., U.S. Office Action mailed Jan. 27, 2010, directed to U.S. Appl. No. 11/499,360; 8 pages.

Ng et al., U.S. Office Action mailed Jan. 14, 2010, directed to U.S. Appl. No. 11/394,493; 20 pages.

Ng et al., U.S. Office Action mailed Jan. 15, 2010, directed to U.S. Appl. No. 11/882,423; 22 pages.

Tsuk et al., U.S. Office Action mailed Dec. 31, 2009, directed to U.S. Appl. No. 11/610,190; 25 pages.

Zadesky et al., U.S. Office Action mailed Feb. 4, 2010, directed to U.S. Appl. No. 11/477,469; 14 pages.

Hotelling, U.S. Office Action mailed Jan. 25, 2010, directed to U.S. Appl. No. 11/482,286; 17 pages.

ISR and Written Opinion mailed Nov. 6, 2009, directed to counterpart PCT/US2009/030621; 14 pages.

Interlink Electronics, VersaPad: Integration Guide, © 1998 (VersaPad), pp. 1-35.

Letter re: Bang & Olufsen a/s by David Safran, Nixon Peabody, LLP, May 21, 2004, with BeoCom 6000 Sales Training Brochure, 7 pages.

Kobayashi et al. (1994) "Development of the Touch Switches with the Click Response," Koukuu Denshi Gihou No. 17, pp. 44-48 (published by the Japan Aviation Electronics Industry, Ltd.).

Photographs of Innovation 2000 Best of Show Award Presented at the 2000 Int'l CES Innovations Design & Engineering Showcase, Jan. 6, 2000, 1 page.

SanDisk Sansa Connect User Guide, 2007; 29 pages.

Robbin, U.S. Appl. No. 60/346,237 entitled, "Method and System for List Scrolling," filed Oct. 22, 2001; 12 pages.

Zadesky et al., U.S. Appl. No. 60/359,551 entitled "Touchpad for Handheld Device," filed Feb. 25, 2002; 34 pages.

Elias et al., U.S. Appl. No. 60/522,107, filed Aug. 16, 2004, entitled, "A Method for Increasing the Spatial Resolution of Touch Sensitive Devices"; 15 pages.

Hotelling, U.S. Appl. No. 60/658,777 titled "Multi-Functional Handheld Device," filed Mar. 4, 2005; 68 pages.

Zadesky et al., U.S. Appl. No. 60/714,609 entitled "Scrolling Input Arrangements Using Capacitive Sensors on a Flexible Membrane," filed Sep. 6, 2005; 17 pages.

Grignon et al., U.S. Appl. No. 60/755,656, filed Dec. 30, 2005, entitled "Touch Pad with Feedback"; 109 pages.

Lampell et al., U.S. Appl. No. 60/810,423, filed Jun. 2, 2006, entitled "Techniques for Interactive Input to Portable Electronic Devices"; 53 pages.

Prest et al., U.S. Appl. No. 60/850,662, filed Oct. 11, 2006, entitled, "Capacitive Scroll Wheel"; 21 pages.

Bollinger, U.S. Appl. No. 60/858,404, filed Nov. 13, 2006, entitled "Method of Capacitively Sensing Finger Position"; 13 pages.

Rothkopf, U.S. Provisional Appl. No. 60/935,854 titled "Compact Media Players," filed Sep. 4, 2007; 36 pages.

Rathnam et al., U.S. Appl. No. 60/992,056, filed Dec. 3, 2007, entitled, "Scroll Wheel Circuit Arrangements and Methods of Use Thereof"; 42 pages.

Rathnam et al., U.S. Appl. No. 61/017,436, filed Dec. 28, 2007, entitled, "Multi-Touch Scroll Wheel Circuit Arrangements and Processing Methods"; 58 pages.

Weber et al., U.S. Appl. No. 61/020,531, filed Jan. 11, 2008 entitled "Modifiable Clickwheel Text"; 11 pages.

Weber et al., U.S. Appl. No. 61/025,531, filed Feb. 1, 2008 entitled "Co-Extruded Materials and Methods"; 11 pages.

Fisher et al., U.S. Appl. No. 61/036,804, filed Mar. 14, 2008 entitled "Switchable Sensor Configurations"; 46 pages.

Tsuk et al., U.S. Office Action mailed Apr. 28, 2010, directed to U.S. Appl. No. 11/610,190; 29 pages.
Zadesky et al., U.S. Office Action mailed Mar. 30, 2010, directed to U.S. Appl. No. 11/592,679; 13 pages.
Hotelling et al., U.S. Office Action mailed Mar. 30, 2010, directed to U.S. Appl. No. 11/483,008; 20 pages.
Elias et al., U.S. Office Action mailed Mar. 30, 2010, directed to U.S. Appl. No. 11/203,692; 15 pages.
Ng et al., U.S. Office Action mailed Jun. 22, 2010, directed to U.S. Appl. No. 11/394,493; 14 pages.
Lampell, U.S. Office Action mailed Jun. 4, 2010, directed to U.S. Appl. No. 11/530,807; 15 pages.
Prest et al., U.S. Office Action mailed Jun. 22, 2010, directed to U.S. Appl. No. 11/878,132; 32 pages.
Prest et al., U.S. Office Action mailed Jun. 22, 2010, directed to U.S. Appl. No. 11/882,882; 32 pages.
Prest et al., U.S. Office Action mailed Jun. 23, 2010, directed to U.S. Appl. No. 11/812,384; 29 pages.
Prest et al., U.S. Office Action mailed Jun. 22, 2010, directed to U.S. Appl. No. 11/882,890; 15 pages.
Prest et al., U.S. Office Action mailed Jun. 22, 2010, directed to U.S. Appl. No. 11/812,383; 21 pages.
Prest et al., U.S. Office Action mailed Jun. 23, 2010, directed to U.S. Appl. No. 11/882,889; 13 pages.
Bollinger et al., U.S. Office Action mailed Jun. 25, 2010, directed to U.S. Appl. No. 11/842,724; 22 pages.
Hotelling, U.S. Office mailed Jun. 9, 2010, directed to U.S. Appl. No. 11/482,286; 21 pages.
Elias et al., U.S. Office Action mailed Jun. 11, 2010, directed to U.S. Appl. No. 11/203,692; 17 pages.
Weber et al., U.S. Office Action mailed Jun. 7, 2010, directed to U.S. Appl. No. 11/856,530; 15 pages.
Robbin et al., U.S. Appl. No. 60/387,692 entitled "Method and Apparatus for Use of Rotational User Inputs," filed Jun. 10, 2002.
Robbin et al., U.S. Appl. No. 60/399,806 entitled "Graphical User Interface and Methods of Use Thereof in a Multimedia Player," filed Jul. 30, 2002.
Tsuk et al., U.S. Office Action mailed Oct. 13, 2006, directed to U.S. Appl. No. 10/256,716; 16 pages.
Tsuk et al., U.S. Office Action mailed Aug. 3, 2006, directed to U.S. Appl. No. 10/256,716; 15 pages.
Tsuk et al., U.S. Office Action mailed Jan. 10, 2006, directed to U.S. Appl. No. 10/256,716; 12 pages.
Tsuk et al., U.S. Office Action mailed Jun. 24, 2005, directed to U.S. Appl. No. 10/256,716; 12 pages.
Tsuk et al., U.S. Office Action mailed Sep. 30, 2004, directed to U.S. Appl. No. 10/256,716; 11 pages.
Tsuk et al., U.S. Office Action mailed Jul. 7, 2009, directed to U.S. Appl. No. 11/610,190; 24 pages.
Robbin et al., U.S. Office Action mailed Jan. 18, 2007, directed to U.S. Appl. No. 10/259,159; 18 pages.
Robbin et al., U.S. Office Action mailed Oct. 13, 2006, directed to U.S. Appl. No. 10/259,159; 18 pages.
Robbin et al., U.S. Office Action mailed Aug. 3, 2006, directed to U.S. Appl. No. 10/259,159; 15 pages.
Robbin et al., U.S. Office Action mailed Jan. 11, 2006, directed to U.S. Appl. No. 10/259,159; 15 pages.
Robbin et al., U.S. Office Action mailed Jun. 16, 2005, directed to U.S. Appl. No. 10/259,159; 16 pages.
Robbin et al., U.S. Office Action mailed Sep. 30, 2004, directed to U.S. Appl. No. 10/259,159; 14 pages.
Zadesky et al., U.S. Office Action mailed Jul. 9, 2008, directed to U.S. Appl. No. 10/643,256; 12 pages.
Zadesky et al., U.S. Office Action mailed Dec. 12, 2007, directed to U.S. Appl. No. 10/643,256; 12 pages.
Zadesky et al., U.S. Office Action mailed Jul. 13, 2007, directed to U.S. Appl. No. 10/643,256; 13 pages.
Zadesky et al., U.S. Office Action mailed Mar. 23, 2007, directed to U.S. Appl. No. 10/643,256; 11 pages.
Zadesky et al., U.S. Office Action mailed Oct. 27, 2006, directed to U.S. Appl. No. 10/643,256; 14 pages.
Forsblad et al., U.S. Office Action mailed Jun. 25, 2009, directed to U.S. Appl. No. 11/355,022; 18 pages.
Forsblad et al., U.S. Office Action mailed Jan. 26, 2009, directed to U.S. Appl. No. 11/355,022; 15 pages.
Hotelling et al., U.S. Office Action mailed Jan. 27, 2009, directed to U.S. Appl. No. 11/882,421; 15 pages.
Zadesky et al., U.S. Office Action mailed Aug. 6, 2009, directed to U.S. Appl. No. 11/057,050; 30 pages.
Zadesky et al., U.S. Office Action mailed Feb. 20, 2009, directed to U.S. Appl. No. 11/057,050; 25 pages.
Zadesky et al., U.S. Office Action mailed Dec. 24, 2008, directed to U.S. Appl. No. 11/057,050; 25 pages.
Zadesky et al., U.S. Office Action mailed Nov. 26, 2008, directed to U.S. Appl. No. 11/057,050; 25 pages.
Zadesky et al, U.S. Office Action mailed Aug. 19, 2008, directed to U.S. Appl. No. 11/057,050; 23 pages.
Zadesky et al., U.S. Office Action mailed Nov. 20, 2007, directed to U.S. Appl. No. 11/057,050; 33 pages.
Zadesky et al., U.S. Office Action mailed Mar. 5, 2009, directed to U.S. Appl. No. 11/477,469; 12 pages.
Zadesky et al., U.S. Office Action mailed Jul. 30, 2004, directed to U.S. Appl. No. 10/188,182; 7 pages.
Zadesky et al., U.S. Office Action mailed Sep. 21, 2005, directed to U.S. Appl. No. 10/188,182; 10 pages.
Zadesky et al., U.S. Office Action mailed Mar. 4, 2004, directed to U.S. Appl. No. 10/188,182; 8 pages.
Zadesky et al., U.S. Office Action mailed Oct. 4, 2007, directed to U.S. Appl. No. 11/386,238; 12 pages.
Zadesky et al., U.S. Office Action mailed Oct. 4, 2007, directed to U.S. Appl. No. 11/806,957; 14 pages.
Marriott et al., U.S. Office Action mailed Jan. 30, 2008, directed to U.S. Appl. No. 10/722,948; 17 pages.
Marriott et al., U.S. Office Action mailed Jul. 13, 2007, directed to U.S. Appl. No. 10/722,948; 15 pages.
Marriott et al., U.S. Office Action mailed Dec. 12, 2006, directed to U.S. Appl. No. 10/722,948; 14 pages.
Marriott et al., U.S. Office Action mailed Jun. 2, 2006, directed to U.S. Appl. No. 10/722,948; 12 pages.
Hotelling et al., U.S. Office Action mailed Jul. 24, 2009, directed to U.S. Appl. No. 11/483,008; 17 pages.
Hotelling et al., U.S. Office Action mailed Jul. 27, 2009, directed to U.S. Appl. No. 11/882,420; 17 pages.
Elias et al., U.S. Office Action mailed Aug. 4, 2009, directed to U.S. Appl. No. 11/203,692; 12 pages.
Elias et al., U.S. Office Action mailed Feb. 23, 2009, directed to U.S. Appl. No. 11/203,692; 13 pages.
Elias et al., U.S. Office Action mailed Sep. 17, 2008, directed to U.S. Appl. No. 11/203,692; 8 pages.
Tsuk et al., U.S. Office Action mailed Aug. 6, 2010, directed to U.S. Appl. No. 11/610,190; 30 pages.
Zadesky et al., U.S. Office Action mailed Aug. 2, 2010, directed to U.S. Appl. No. 11/882,004; 9 pages.
Marriott et al., U.S. Office Action mailed Aug. 19, 2010, directed to U.S. Appl. No. 11/882,422; 13 pages.
Hotelling, U.S. Office Action mailed Aug. 18, 2010, directed to U.S. Appl. No. 11/882,424; 16 pages.
Bull, U.S. Office Action mailed Jul. 9, 2010, directed to U.S. Appl. No. 11/849,801; 13 pages.
"About Quicktip®" www.logicad3d.com/docs/qt.html, downloaded Apr. 8, 2002.
"Alps Electric Ships GlidePoint Keyboard for the Macintosh; Includes a GlidePoint Touchpad, Erase-Eaze Backspace Key and Contoured Wrist Rest," Business Wire (Jul. 1, 1996).
"Alps Electric introduces the GlidePoint Wave Keyboard; combines a gently curved design with Alps' advanced GlidePoint Technology," Business Wire (Oct. 21, 1996).
"Apple Presents iPod: Ultra-Portable MP3 Music Player Puts 1,000 Songs in Your Pocket," retreived from http://www.apple.com/pr/library/2001/oct/23ipod.html on Oct. 23, 2001.
"Apple Unveils Optical Mouse and New Pro Keyboard," Press Release, Jul. 19, 2000.
"APS show guide to exhibitors," Physics Today 49(3) (Mar. 1996).
"Atari VCS/2600 Peripherals," www.classicgaming.com/gamingmuseum/2006p.html, downloaded Feb. 28, 2007, pp. 1-15.
"Der Klangmeister," Connect Magazine, Aug. 1998.

"Design News literature plus," Design News 51(24) (Dec. 18, 1995).
"Neuros MP3 Digital Audio Computer," www.neurosaudio.com, downloaded Apr. 9, 2003.
"OEM Touchpad Modules" website www.glidepoint.com/sales/modules.index.shtml, downloaded Feb. 13, 2002.
"Product Overview—ErgoCommander®," www.logicad3d.com/products/ErgoCommander.htm, downloaded Apr. 8, 2002.
"Product Overview—SpaceMouse® Classic," www.logicad3d.com/products/Classic.htm, downloaded Apr. 8, 2002.
"System Service and Troubleshooting Manual," www.dsplib.com/intv/Master, downloaded Dec. 11, 2002.
"Synaptics Tough Pad Interfacing Guide," Second Edition, Mar. 25, 1998, Synaptics, Inc., San Jose, CA, pp. 1-90.
"Triax Custom Controllers due; Video Game Controllers," HFD—The Weekly Home Furnishing Newspaper 67(1) (Jan. 4, 1993).
Ahl, David, "Controller Update," Creative Computing Vo. 9, No. 12, Dec. 1983.
Ahmad, "A Usable Real-Time 3D Hand Tracker," Proceedings of the 28th Asilomar Conference on Signals, Systems and Computers—Part 2 (of 2) vol. 2 (Oct. 1994).
Baig, E.C., "Your PC Just Might Need a Mouse," U.S. News & World Report 108(22) (Jun. 4, 1990).
Bang & Olufsen Telecom a/s, "BeoCom 6000 User Guide 2000."
Bartimo, Jim, "The Portables: Travelling Quickly," Computerworld (Nov. 14, 1983).
BeoCom 6000, Sales Training Brochure, date unknown.
Bray, "Phosphors help switch on xenon," Physics in Action, pp. 1-3, Apr. 1999.
Brink et al., "Pumped-up portables," U.S. News & World Report 116(21) (May 30, 1994).
Brown et al., "Windows on Tablets as a Means of Achieving Virtual Input Devices," Human-Computer Interaction—INTERACT '90 (1990).
Buxton et al., "Issues and Techniques in Touch-Sensitive Tablet Input," Computer Graphics 19(3), Proceedings of SIGGRAPH '85 (1985).
Chapweske, Adam "PS/2 Mouse/Keyboard Protocol," 1999, http://panda.cs.ndsu.nodak.edu/~achapwes/PICmicro/PS2/ps2.htm.
Chen et al., "A Study in Interactive 3-D Rotation Using 2-D Control Devices," Computer Graphics 22(4) (Aug. 1988).
Chinese Office Action issue Dec. 29, 2006, directed to CN Application No. 200510103886.3, 25 pages.
De Meyer, Kevin, "Crystal Optical Mouse," Feb. 14, 2002, Heatseekerz, Web Article 19.
Evans et al., "Tablet-based Valuators that Provide One, Two, or Three Degrees of Freedom," Computer Grahics 15(3) (Aug. 1981).
EVB Elektronik "TSOP6238 IR Receiver Modules for Infrared Remote Control Systems" dated Jan. 2004 1 page.
Fiore, "Zen Touchpad," Cornell University, May 2000.
Gadgetboy, "Point and click with the latest mice," CNET Asia Product Review, www.asia.cnet.com/reviews...are/gadgetboy/0,39001770,380235900,00.htm, downloaded Dec. 5, 2001.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Jesitus, John, "Broken promies?", Industry Week/IW 246(20) (Nov. 3, 1997).
Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).
Kobayashi et al. (1997) "Dynamic Soundscape: Mapping Time to Space for Audio Browsing," Computer Human Interaction: 16 pages.
Kobayashi et al. "Development of the Touch Switches with the Click Response," Koukuu Denshi Gihou No. 17, pp. 44-48 (Mar. 1994) (published by the Japan Aviation Electronics Industry, Ltd.).
Letter re: Bang & Olufsen a/s by David Safran, Nixon Peabody, LLP May 21, 2004.
Luna Technologies International, Inc., LUNA Photoluminescent Safety Products, "Photoluminescence—What is Photoluminescence?" from website at http://www.lunaplast.com/photoluminescence.com on Dec. 27, 2005.
"Manufactures," Laser Focus World, Buyers Guide '96, 31(12) (Dec. 1995).
Mims, Forrest M., III, "A Few Quick Pointers; Mouses, Touch Screens, Touch Pads, Light Pads, and the Like Can Make System Easier to Use," Computers & Electronics (22) (May 1984).
Nass, Richard, "Touchpad input device goes digital to give portable systems a desktop 'mouse-like' feel," Electronic Design 44(18) (Sep. 3, 1996).
"National Design Engineering Show," Design News 52(5) (Mar. 4, 1996).
Perenson, Melissa, "New & Improved: Touchpad Redux," PC Magazine (Sep. 10, 1996).
Petersen, Marty, "Koala Pad Touch Tablet & Micro Illustrator Software," InfoWorld (Oct. 10, 1983).
Petruzzellis, "Force-Sensing Resistors," Electronics Now 64(3) (Mar. 1993).
Photographs of Innovation 2000 Best of Show Award Presented at the 2000 Int'l CES Innovations 2000 Design & Engineering Showcase, 1 page.
"Preview of exhibitor booths at the Philadelphia show," Air Conditioning, Heating & News 200(2) (Jan. 13, 1997).
"Product news," Design News 53(9) (May 5, 1997).
"Product news," Design News 53(11) (Jun. 9, 1997).
Sony presents "Choice Without Compromise" at IBC '97 M2 Presswire (Jul. 24, 1997).
Spiwak, Marc, "A Great New Wireless Keyboard," Popular Electronics 14(12) (Dec. 1997).
Spiwak, Marc, "A Pair of Unusual Controllers," Popular Electronics 14(4) (Apr. 1997).
Soderholm, Lars G., "Sensing Systems for 'Touch and Feel,'" Design News (May 8, 1989): pp. 72-76.
Sylvania, "Intellvision™ Intelligent Television Master Component Service Manual," pp. 1, 2 and 8, 1979.
Tessler, Franklin, "Point Pad," Macworld 12(10) (Oct. 1995).
Tessler, Franklin, "Touchpads," Macworld 13(2) (Feb. 1996).
Tessler, Franklin, "Smart Input: How to Chose from the New Generation of Innovative Input Devices," Macworld 13(5) (May 1996).
"Touchpad," Notebook PC Manual, ACER Information Co. Ltd., Feb. 16, 2005, pp. 11-12.
SanDisk Sansa Connect User Guide; 29 pages.
Translation of Trekstor's Defense Statement to the District Court Mannheim of May 23, 2008; 37 pages.
"Diamond Multimedia Announces Rio PMP300 Portable MP3 Music Player," located at http://news.harmony-central.com/Newp/1998/Rio-PMP300.html visited on May 5, 2008. (4 pages).
Tsuk et al., U.S. Office Action mailed Aug. 7, 2009, directed to U.S. Appl. No. 11/610,181; 20 pages.
Robbin et al., U.S. Office Action mailed Aug. 10, 2009, directed to U.S. Appl. No. 11/610,376; 11 pages.
Robbin et al., U.S. Office Action mailed Aug. 12, 2009, directed to U.S. Appl. No. 11/610,384; 20 pages.
Hotelling, U.S. Office Action mailed Sep. 1, 2009, directed to U.S. Appl. No. 11/482,286; 14 pages.
Lampell, U.S. Office Action mailed Sep. 15, 2009, directed to U.S. Appl. No. 11/530,807; 15 pages.
Boling, Douglas (1993) "Programming Microsoft Windows CE.NET," p. 109.
Tsuk et al., U.S. Office Action mailed Nov. 1, 2010, directed to U.S. Appl. No. 11/959,918; 8 pages.
Tsuk et al., U.S. Office Action mailed Oct. 26, 2010, directed to U.S. Appl. No. 11/959,942; 27 pages.
Robbin et al., U.S. Office Action mailed Oct. 29, 2010, directed to U.S. Appl. No. 11/838,845; 8 pages.
Ng et al., U.S. Office Action mailed Oct. 26, 2010, directed to U.S. Appl. No. 11/882,423; 18 pages.
Zadesky et al., U.S. Office Action mailed Oct. 4, 2010, directed to U.S. Appl. No. 11/057,050; 31 pages.
McKillop et al., U.S. Office Action mailed Sep. 16, 2010, directed to U.S. Appl. No. 11/591,752; 14 pages.
Zadesky et al., U.S. Office Action mailed Sep. 29, 2010, directed to U.S. Appl. No. 11/882,003; 13 pages.
Hotelling, U.S. Office Action mailed Oct. 1, 2010, directed to U.S. Appl. No. 11/482,286; 28 pages.

Hotelling et al., U.S. Office Action mailed Oct. 27, 2010, directed to U.S. Appl. No. 11/483,008; 23 pages.
Ng et al., U.S. Office Action mailed Dec. 9, 2010, directed to U.S. Appl. No. 11/394,493; 13 pages.
Zadesky et al., U.S. Office Action mailed Nov. 16, 2010, directed to U.S. Appl. No. 11/477,469; 13 pages.
Lampell, U.S. Office Action mailed Dec. 3, 2010, directed to U.S. Appl. No. 11/530,807; 17 pages.
Lampell et al., U.S. Office Action mailed Dec. 22, 2010, directed to U.S. Appl. No. 11/882,427; 16 pages.
Hotelling, U.S. Office Action mailed Dec. 8, 2010, directed to U.S. Appl. No. 11/482,286; 33 pages.
Elias et al., U.S. Office Action mailed Nov. 22, 2010, directed to U.S. Appl. No. 11/203,692; 6 pages.
Zadesky et al, U.S. Office Action mailed Feb. 1, 2011, directed to U.S. Appl. No. 11/882,004; 16 pages.
Bull, U.S. Office Action mailed Feb. 4, 2011, directed to U.S. Appl. No. 11/849,801; 22 pages.
Weber et al, U.S. Office Action mailed Jan. 7, 2011, directed to U.S. Appl. No. 11/856,530; 13 pages.
Weber et al., U.S. Office Action mailed Feb. 17, 2011, directed to U.S. Appl. No. 12/844,502; 11 pages.
Tsuk et al., U.S. Office Action mailed Apr. 19, 2011 directed to U.S. Appl. No. 11/610,190; 25 pages.
Tsuk et al., U.S. Office Action mailed Mar. 31, 2011, directed to U.S. Appl. No. 11/959,918; 9 pages.
Robbin et al., U.S. Office Action mailed Apr. 26, 2011, directed to U.S. Appl. No. 11/838,845; 9 pages.
Zadesky et al., U.S. Office Action mailed Mar. 31, 2011, directed to U.S. Appl. No. 11/882,005; 7 pages.
Bollinger et al., U.S. Office Action mailed Mar. 21, 2011, directed to U.S. Appl. No. 11/842,724; 22 pages.
McKillop et al., U.S. Office Action mailed Mar. 24, 2011, directed to U.S. Appl. No. 11/591,752; 11 pages.
Zadesky et al., U.S. Office Action mailed Mar. 16, 2011, directed to U.S. Appl. No. 11/882,003; 12 pages.
Rathnam et al., U.S. Office Action mailed Mar. 24, 2011, directed to U.S. Appl. No. 12/205,757; 14 pages.

* cited by examiner

DYNAMIC INPUT GRAPHIC DISPLAY

CROSS REFERENCE TO RELATED APPLICATION

This claims priority under 35 USC 119(e) to U.S. Provisional Application No. 61/020,531, filed Jan. 11, 2008, the entirety of which is incorporated by reference herein.

FIELD OF THE DISCLOSURE

This relates generally to input devices, and more particularly to providing dynamic displays associated with input devices.

BACKGROUND

The usability and appeal of an electronic device can depend in large part upon the degree to which a user interface associated with the device is perceived as natural or intuitive. The user interface tends to act as a gateway through which a user interacts with the device, including the device's features, tools, and functions. Some conventional user interfaces include input devices utilizing mechanical pushbuttons, for example, that can be associated with particular functionality when pressed.

Pushbuttons can provide a natural and intuitive mechanism by which a user may provide input to a device, but they can also be inflexible. For instance, pushbuttons integrated into the physical make-up of a device tend to have fixed locations and orientations relative to the device. Additionally, the location and orientation of any graphics, such as labels, associated with the pushbuttons also tend to be fixed relative to the device.

As electronic devices evolve, they tend to decrease in size and provide increased functionality. However, the development of user interfaces to support such advances can be constrained by the physical limitations of the associated input devices.

SUMMARY

To improve user interfaces of electronic devices, an input device is disclosed that can modify the appearance and/or location of graphics associated with an input area of a device. The input device, for example, can enable a device to provide "virtual" buttons—graphical representations of buttons as viewed by a user and the button functionality associated therewith—that can be dynamically moved and mapped to different mechanical button areas provided in fixed locations within the device.

Such a configuration provides greater flexibility in the use and configuration of many input devices while overcoming their physical constraints.

The appearance and/or location of an input area's graphics can be modified based on various factors, such as device orientation, application context, etc. In one example, an input device can have a button layout that shifts based on the orientation of the electronic device relative to the user, such that the button layout is consistently presented to the user in an upright orientation. In another example, the input device can rotate and/or rename a button input area region depending on the context of an application running on the electronic device. In a further example, the input device can display dynamic graphic content in an input area which is distinct from a display screen of the electronic device. Such content can include, for example, a volume indicator and/or textual content on a wheel-based input device, and can be displayed when the display screen of the electronic device is off.

DETAILED DESCRIPTION

The present disclosure describes embodiments of an input device that can modify the appearance and/or location of graphics associated with an input area of a device. Such modifications can enable a device to provide "virtual" buttons—graphical representations of buttons as viewed by a user and the button functionality associated therewith—that can be dynamically moved and mapped to different mechanical button areas provided in fixed locations within the device. Such modifications can also enable the display of dynamic graphic content in an input area which is distinct from a display screen of the electronic device.

Such a configuration overcomes the physical constraints associated with many input devices, and provides greater flexibility in the use and configuration of such input devices.

Figure 1:
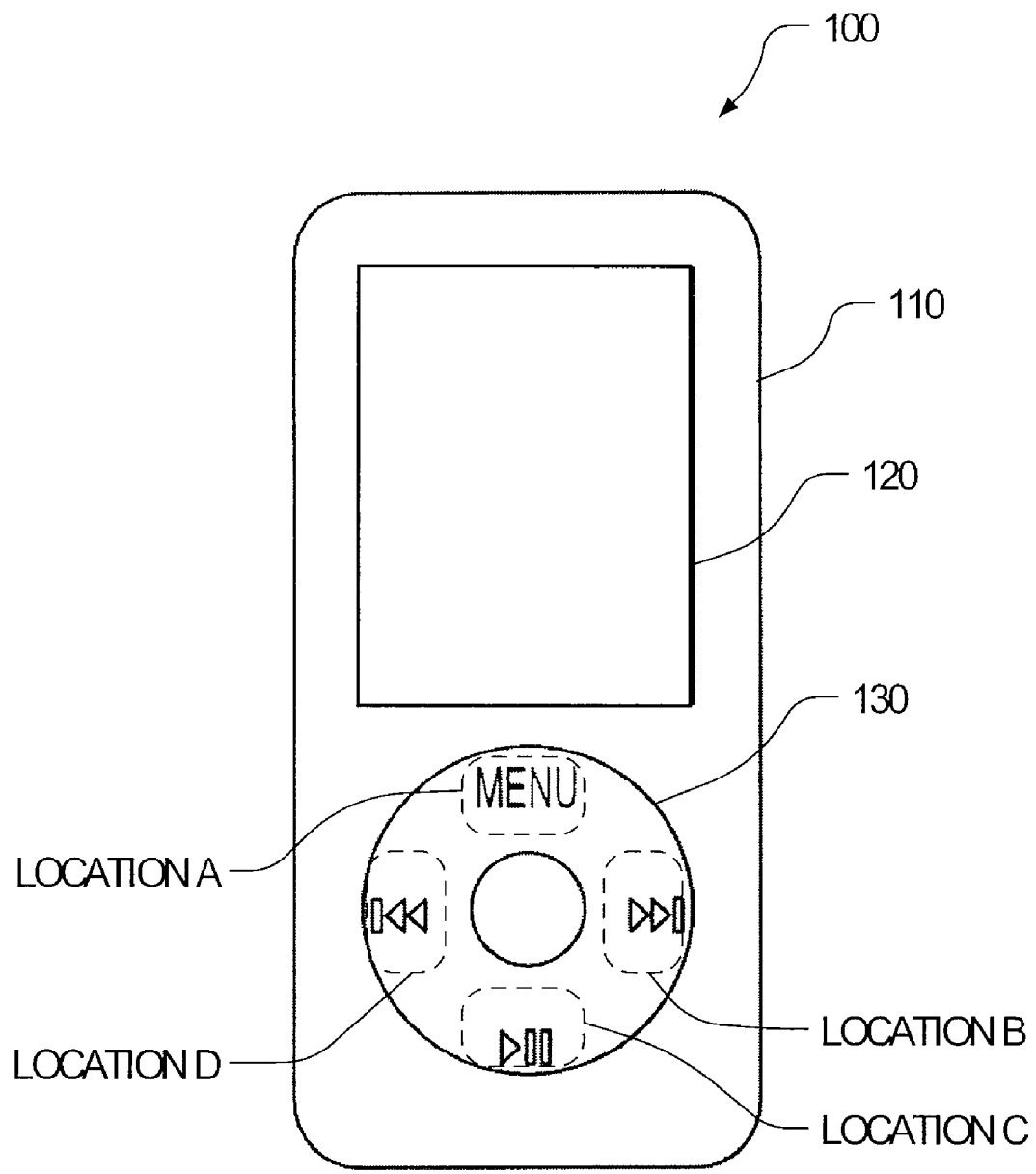
FIG. 1 illustrates an example of a electronic device.
Figure 2A:
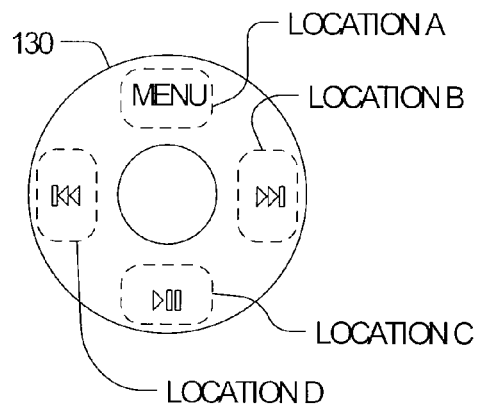
FIGS. 2A-2D illustrate examples of dynamic input area graphic arrangements.
Figure 2B:
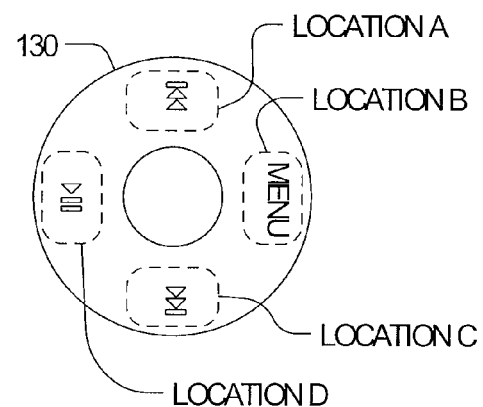
Figure 2C:
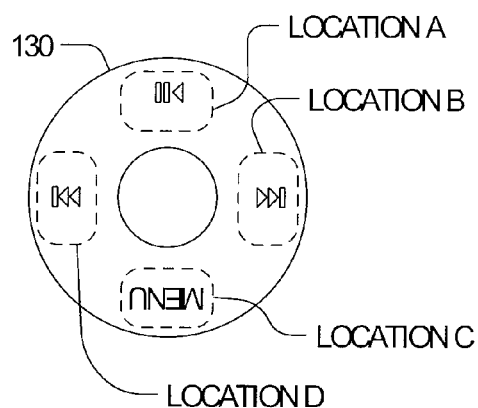
Figure 2D:
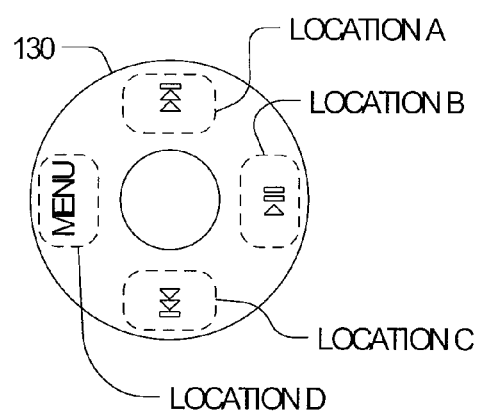

FIG. 1 illustrates an example of an electronic device. The electronic device may be any consumer electronic product. The electronic device may be a computing device and more particularly it may be a media player, PDA, phone, remote control, camera and the like. In the embodiment illustrated in FIG. 1, the electronic device 100 may correspond to a media player. The term "media player" generally refers to computing devices dedicated to processing media such as audio, video or other images, including, for example, music players, game players, video players, video recorders and the like. These devices can be portable to allow a user to, for example, listen to music, play games or video, record video or take pictures wherever the user travels. In one embodiment, the electronic device can be a handheld device that is sized for placement into a pocket of the user. By being pocket sized, the device may be taken almost anywhere the user travels (e.g., the user is not limited by carrying a large, bulky and often heavy device, as in a portable computer). Furthermore, the device can be operated in the user's hands, thus no reference surface such as a desktop is required.

Electronic devices (e.g., media players) generally have connection capabilities that allow a user to upload and download data to and from a host device, such as a general purpose computer (e.g., desktop computer, portable computer, etc.). For example, in the case of a camera, photo images can be downloaded to the general purpose computer for further processing (e.g., printing). With regard to music players, for example, songs and play lists stored on the general purpose computer can be downloaded into the music player. In the embodiment illustrated in FIG. 1, electronic device 100 can be a pocket-sized hand-held media player (e.g., MP3 player) that allows a user to store a collection of music, photos, album art, contacts, calendar entries, and other desirable media assets. It should be appreciated however, that media players are not a limitation as the electronic device may be embodied in other forms as mentioned above.

As shown in FIG. 1, electronic device 100 may include housing 110 that can enclose various electrical components, such as integrated circuit chips and other circuitry, for example. The integrated circuit chips and other circuitry may include, for example, a microprocessor, memory (e.g., ROM, RAM), a power supply (e.g., battery), a circuit board, a hard drive or Flash (e.g., Nand flash) for storing media for example, one or more orientation detection elements (e.g., accelerometer) and various input/output (I/O) support circuitry. In the case of music players, the electrical components can include components for outputting music such as an amplifier and a digital signal processor (DSP) for example. In the case of video recorders or cameras the electrical components can include components for capturing images such as image sensors (e.g., charge coupled device (CCD) or complimentary oxide semiconductor (CMOS)) or optics (e.g., lenses, splitters, filters) for example. In addition to the above, the housing can also define the shape or form of the electronic device. That is, the contour of housing 102 may embody the outward physical appearance of electronic device 100 in one embodiment.

Electronic device 100 may also include display screen 120. Display screen 120 can be used to display a graphical user interface as well as other information to the user (e.g., text, objects, graphics). By way of example, display screen 120 may be a liquid crystal display (LCD). In one embodiment, the display screen can correspond to a X-by-Y pixel high-resolution display, with a white LED backlight to give clear visibility in daylight as well as low-light conditions. Display screen 120 can also exhibit a "wide screen" aspect ratio (e.g., similar to a 16:9 aspect ratio) such that it may be relatively easy to perceive portrait and landscape orientations.

Electronic device 100 may also include input device 130. Input device 130 can be configured to provide one or more control functions for controlling various applications associated with electronic device 100. For example, a control function can be used to move an object or perform an action on display screen 120 or to make selections or issue commands associated with operating electronic device 100. Input device 130 may be widely varied. In one embodiment, input device 130 can include one or more movable sensor mechanisms for detecting input. The movable sensor mechanism can include, for example, one or more moving members that actuate a switch when a particular area of input device 130 is pressed. The movable sensor mechanism may operate as a mechanical push button and perform a clicking action when actuated. For example, input device 130 can include a movable platform that provides clicking actions at particular input area regions corresponding to button locations. For the purpose of the present disclosure, input area regions corresponding to button locations may also be referred to as button input area regions or button regions. In this example, Locations A-D, as illustrated in FIG. 1, can pertain to four button input area regions associated with a movable sensor mechanism, such as a movable platform that can be configured to tilt and/or depress in the regions indicated by Locations A-D for example. Although four button input area regions are indicated by Locations A-D, input device 130 can be configured to employ any desired number of button input area regions. In a further embodiment, input device 130 may include a combination of a rigid sensor mechanism and one or more movable sensor mechanisms. A rigid sensor mechanism can include, for example, a touch sensitive surface that provides location information for an object, such as a finger for example, in contact with or in proximity to the touch sensitive surface.

An example of an input device comprising a rigid sensor mechanism may be found in U.S. Pat. No. 7,046,230 entitled "Touch Pad Handheld Device," which is incorporated herein by reference in its entirety. An example of an input device comprising a combination of a rigid sensor mechanism and a movable sensor mechanism may be found in U.S. patent application Ser. No. 11/812,383 entitled "Gimballed Scroll Wheel," filed Jun. 18, 2007, which is incorporated herein by reference in its entirety.

Various graphical features such as icons, symbols, text, etc. may be associated with input device 130. In the embodiment illustrated in FIG. 1, for example, graphical features indicated on the surface of input device 130 may be associated with the operation of electronic device 100 and placed relative to Locations A-D. In this embodiment, input device 130 can detect a menu button event when the Location A, graphically indicated by the "MENU" symbol, is pressed. Similarly, a forward button event can be detected when the Location B, graphically indicated by the forward symbol, is pressed. A pause/play button event can be detected when Location C, graphically indicated by the pause/play symbol, is pressed. And a reverse button event can be detected when Location C, graphically indicated by the reverse symbol, is pressed. In this embodiment, only the discrete areas of input device 130 indicated by Locations A-D can be displayable. The non-display regions of input device 130 can be opaque or not include displayable functionality.

In accordance with one embodiment, each of the button input area regions such as Locations A-D can include dynamically controlled and discretely placed display nodes that can change the button layout of input device 130. The button layout can include, for example, the graphic features and corresponding button functionality associated with each button input area region of input device 130. The button layout may, for example, be configured to change in accordance with the orientation of electronic device 100 so that the button layout is consistently presented to a user of the device in an upright orientation (relative to gravity, for example). In one example, when electronic device 100 is held in a portrait orientation, its button layout can be displayed similarly to what is illustrated in FIG. 1. However, when electronic device 100 is moved to a landscape orientation such that the entire device is oriented sideways rather than upright, the button layout assigned to Locations A-D can shift so that it is presented in a similar upright orientation relative to the user. FIGS. 2A-2D illustrate examples of how the button layout of input device 130 can shift relative to Locations A-D based on four different orientations of electronic device 100. In this manner, the orientation of the button layout relative to a user of electronic device 100 can remain substantially constant even though the orientation of the button layout relative to electronic device 100 changes.

Figure 3A:
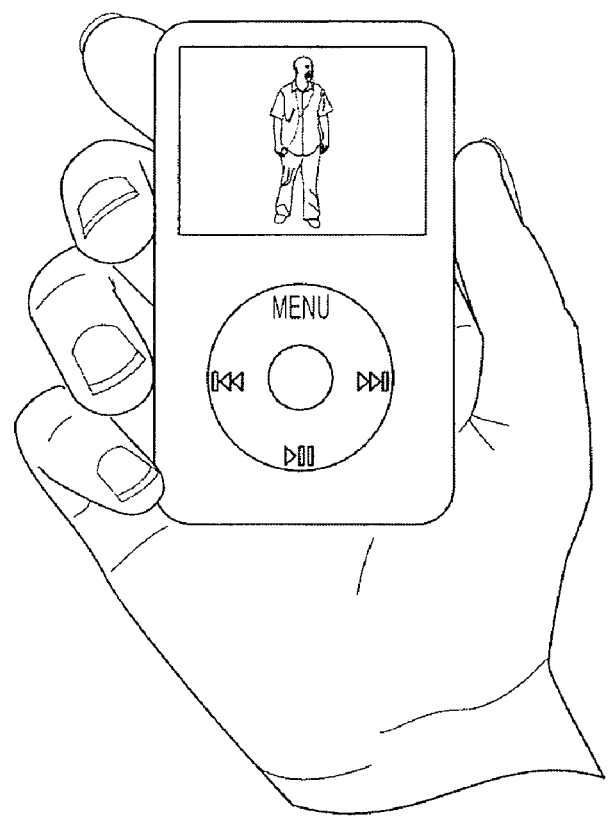
FIGS. 3A and 3B illustrate examples of button layouts in different device orientations.
Figure 3B:
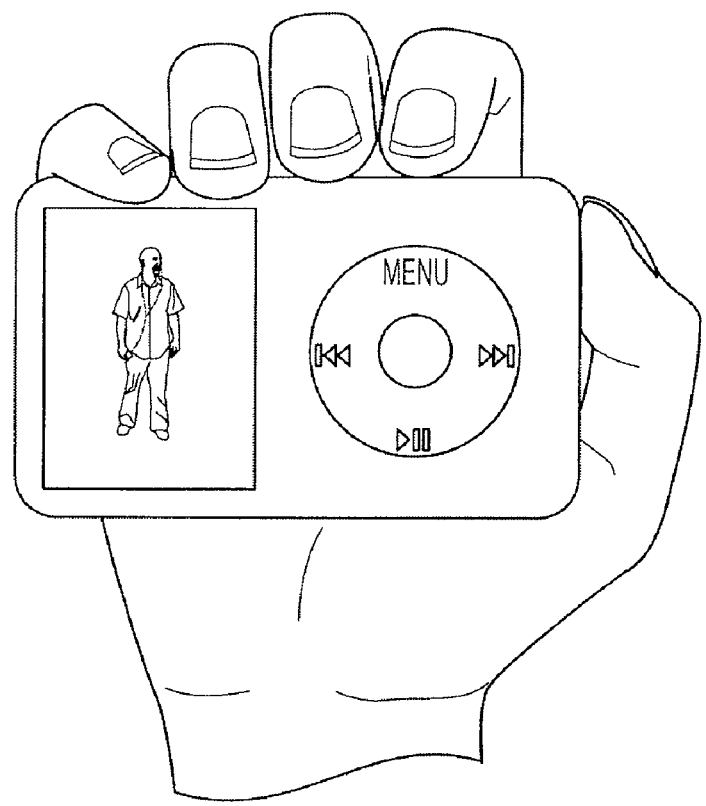
Figure 4A:
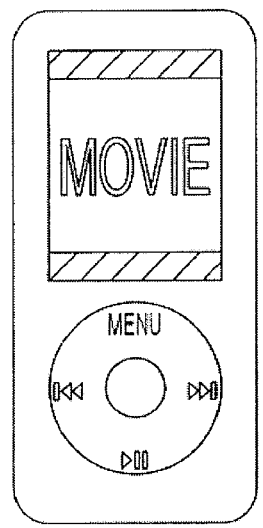
FIGS. 4A-4D illustrate examples of button layouts in different device orientations.
Figure 4B:
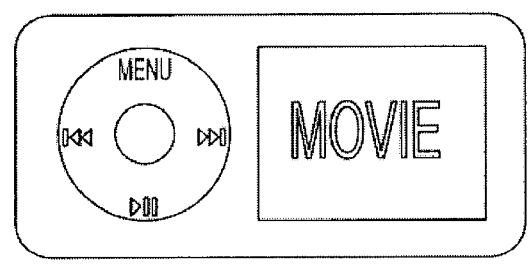
Figures 4C, 4D:
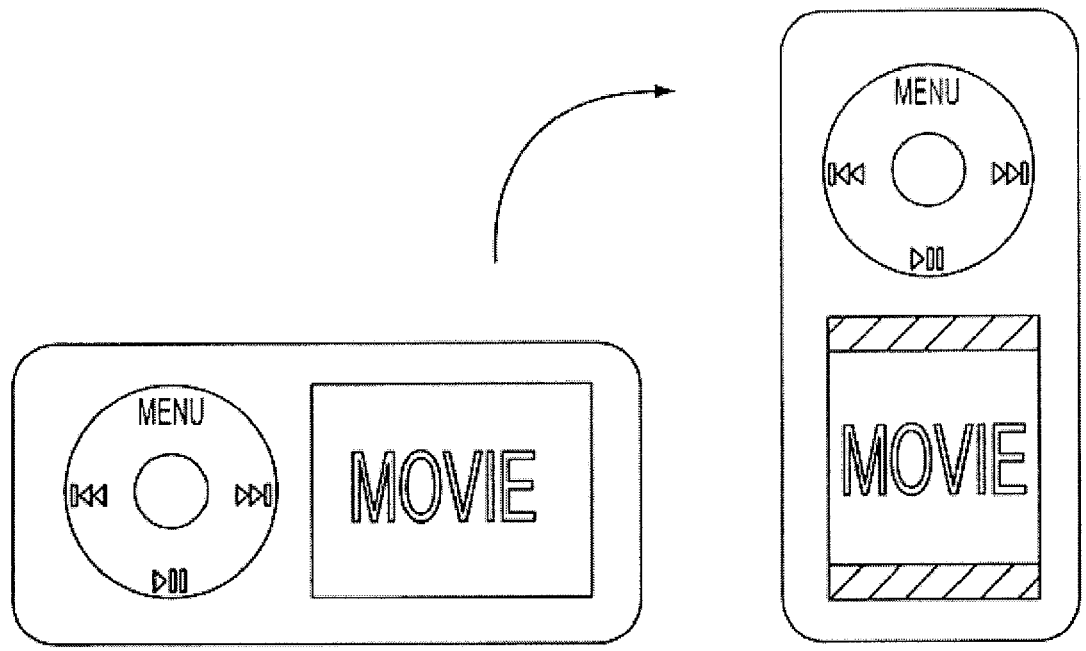
Figure 5A:
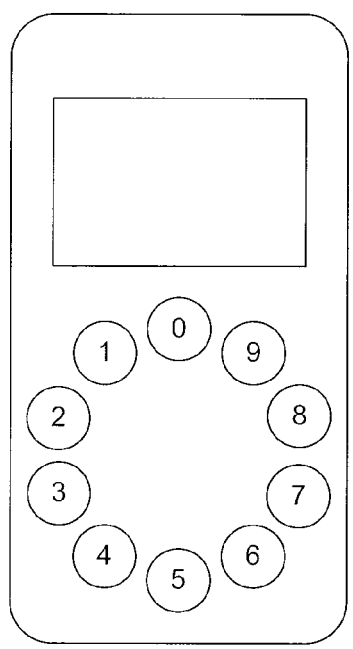
FIGS. 5A and 5B illustrate examples of button layouts in different device orientations.
Figure 5B:
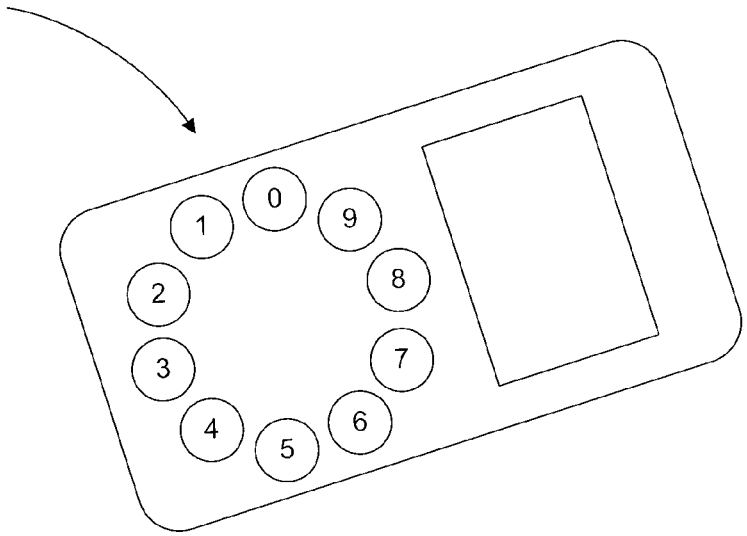
Figure 6A:
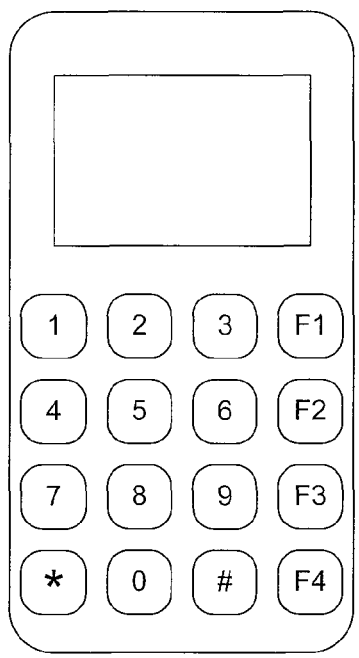
FIGS. 6A and 6B illustrate examples of button layouts in different device orientations.
Figure 6B:
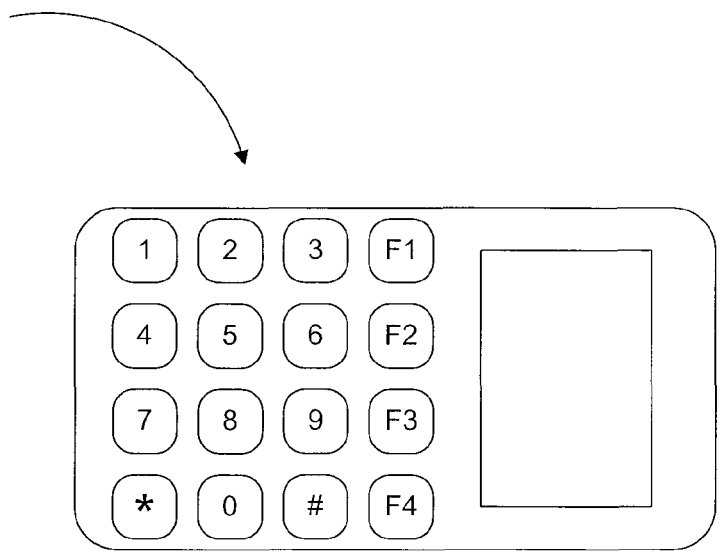

Referring to the embodiments illustrated in FIGS. 3 and 4, the illustrated electronic devices (generally corresponding to electronic device 100) can be moveable between at least a first device orientation and a second device orientation. For example, a user may prefer a first device orientation for watching a movie and a second device orientation for navigating though a list of songs or other media items. In the embodiments illustrated in FIGS. 3A, 3B, 4A and 4B, the first device orientation (as shown in FIGS. 3A and 4A) is oriented in a substantially vertical orientation, and the second device orientation (as shown in FIGS. 3B and 4B) is oriented in a substantially horizontal orientation. In the embodiment illustrated in FIGS. 4C and 4D, the first device orientation (as shown in FIG. 4C) is oriented in a substantially horizontal orientation, and the second device orientation (as shown in FIG. 4D) is oriented in a substantially vertical orientation.

Referring to the embodiment illustrated in FIG. 3A, when the device is vertically oriented, the icons and the input device (generally corresponding to input device 130) can define a first relative orientation and a first relative position. For example, if the input device is thought of as a clock face, with the region of the input device closest to the display being at or near the 12 o'clock position, then in the vertical orientation illustrated in FIG. 3A the relative arrangement between the icons and the input device can be characterized as follows:

Menu=12 o'clock
Fast forward=3 o'clock
Pause/play=6 o'clock
Fast reverse=9 o'clock Referring to the embodiment illustrated FIG. 3B, when the device is horizontally oriented, the icons and the input device can define a different relative orientation and position than in FIG. 3A. In the example illustrated in FIG. 3 the input device is fixed relative to the electronic device. Consequently, when the device is turned approximately 90 degrees from the vertical position (FIG. 3A) to horizontal position (FIG. 3B), the four graphical features associated with the button input area regions can move relative to the device. In this embodiment, the button input area region of the input device closest to the display in FIG. 3A (at Location A), referred to above as the 12 o'clock region, remains the button input area region of the input device closest to the display in FIG. 3B (at Location A). Because the input device is fixed relative to the device in this example, the relative positions of the input device and the display do not change. However, as shown in FIG. 3B, the orientation and position of the icons relative to the input device do change. Again, if the region of the input device closest to the display at Location A is consistently referred to as the 12 o'clock region, then the relative arrangement between the icons and the input device in FIG. 3B can be characterized as follows:

Menu=3 o'clock
Fast forward=6 o'clock
Pause/play=9 o'clock
Fast reverse=12 o'clock Stated somewhat differently, when the electronic device is positioned vertically, as shown in the embodiment of FIG. 3A, the icons associated with the input device can define a first device orientation and location relative to the user operating the device. The first device orientation and location relative to the user does not change when the electronic device is moved from the vertical position to the horizontal position shown in the embodiment of FIG. 3B. Even though the electronic device, and the input device fixed to the electronic device, may have moved, the menu icon appears at what the user perceives as the "top" of the input device in both orientations. The pause/play icon appears at what the user perceives as the "bottom" of the input device in both orientations. Similarly, relative to the user, the orientations and locations of the fast forward and fast reverse icons do not change, even though the device itself may have been rotated by approximately 90 degrees. The icons may appear to "line up" in a consistent and familiar visual pattern despite changes in orientation of the device.

FIGS. 3 and 4 illustrate examples in which a device can be moveable between a horizontal orientation and a vertical orientation. However, the subject matter described and claimed herein is not limited to a specific number of orientations, and is not limited to orientations that may be characterized as horizontal or vertical.

Examples of modifying application context based on device orientation may be found in U.S. patent application Ser. No. 11/767,409 entitled "ELECTRONIC DEVICE WITH IMAGED BASED BROWSERS", filed Jun. 22, 2007, and U.S. patent application Ser. No. 11/969,800 entitled "MODAL CHANGE BASED ON ORIENTATION OF A PORTABLE MULTIFUNCTION DEVICE", filed Jan. 4, 2008, all of which are herein incorporated by reference.

Although FIGS. 3 and 4 illustrate button layout common to electronic devices such as media players, it should be appreciated that this is not a limitation. By way of example, in the case of a phone, as shown in FIGS. 5A and 5B and FIGS. 6A and 6B, the button layout may be adjusted according to device orientation. That is, the button layout for the phone keys may be presented in an upright orientation no matter the orientation of the device relative to the user.

Figure 7:
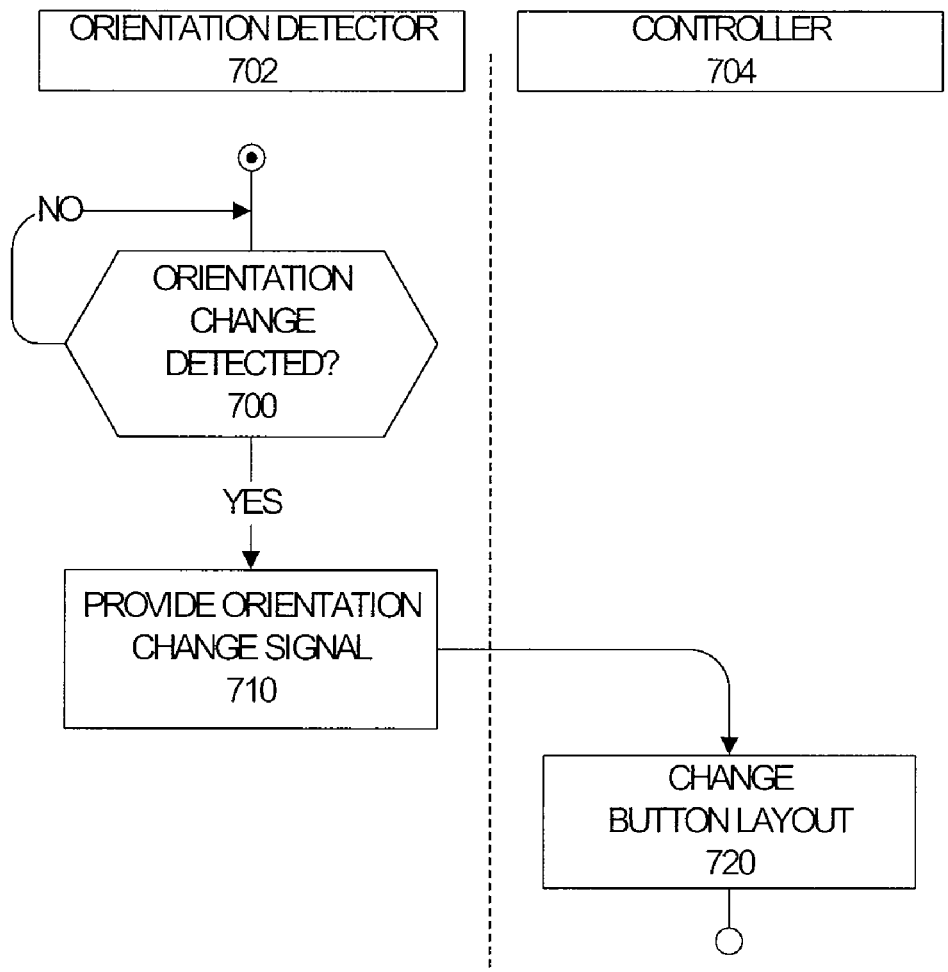
FIG. 7 illustrates an example of a button layout change process.
Figure 8:
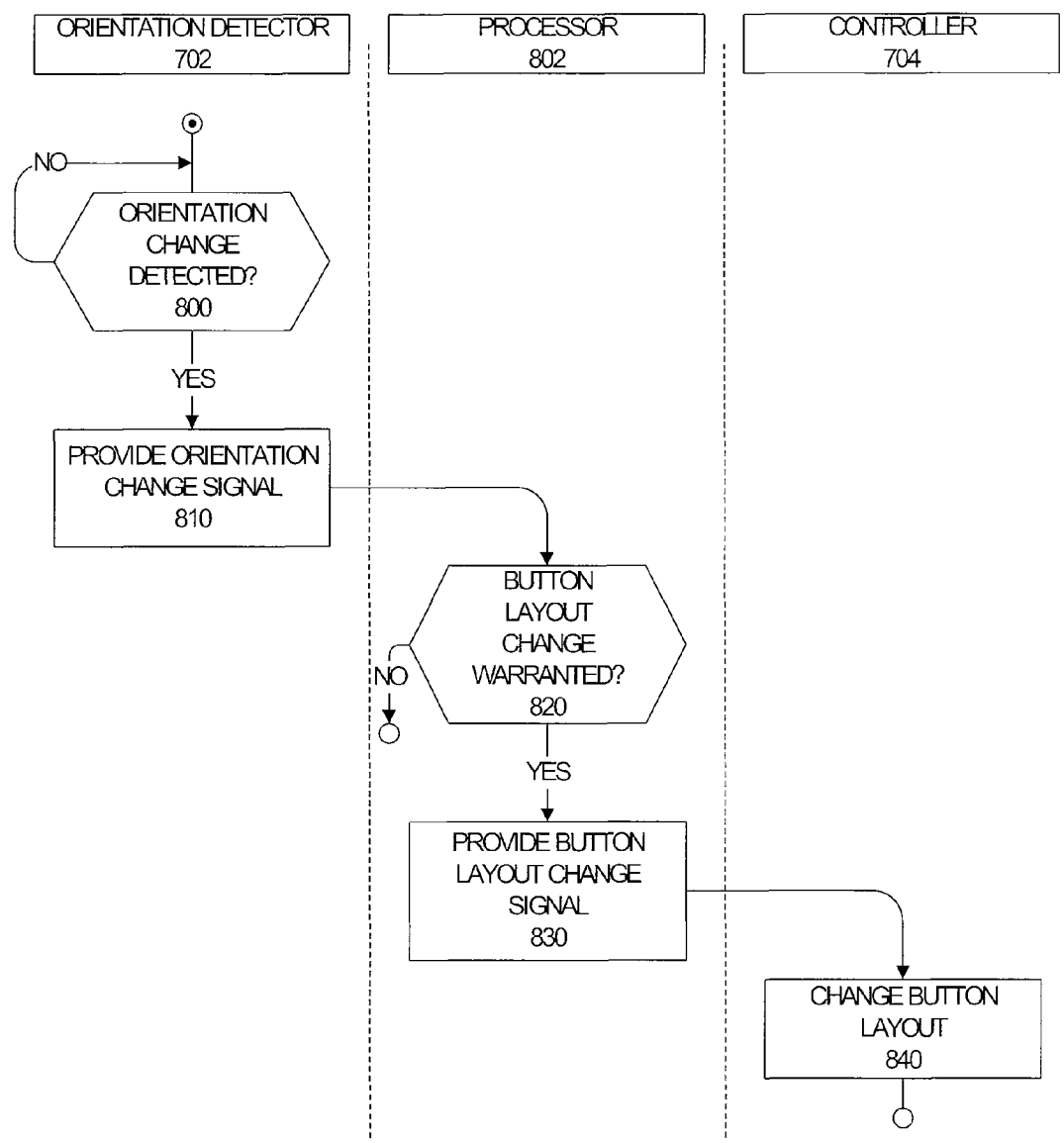
FIG. 8 illustrates an example of a button layout change process.
Figure 9:
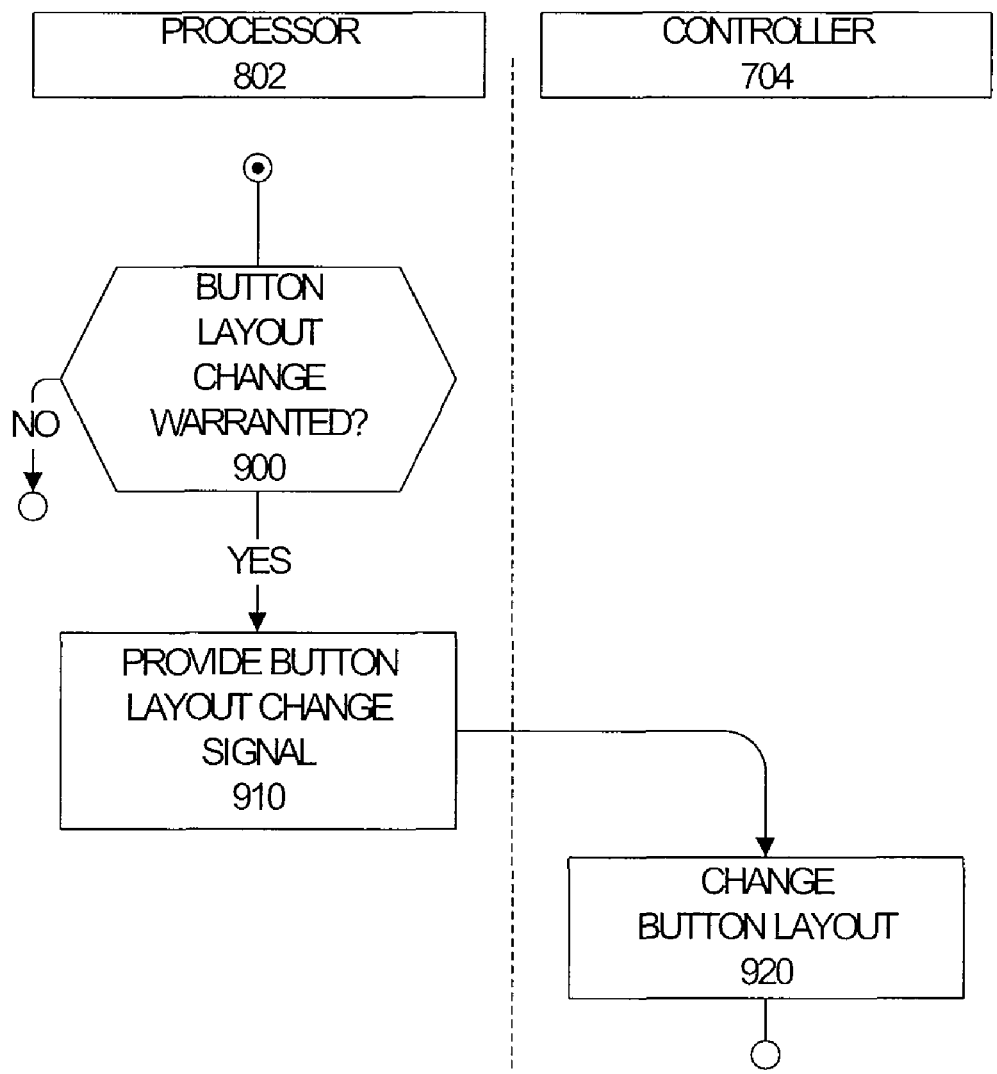
FIG. 9 illustrates an example of a button layout change process.

FIGS. 7-9 illustrate examples of processes by which the button layouts associated with an input area can change. The example of FIG. 7 illustrates a process in which electronic device 100 utilizes orientation detector 702 and controller 704 to effect a change in the display and operation of an input device. Orientation detector 702 can be configured to detect an orientation of electronic device 100, and may include an accelerometer to detect device orientation relative to gravity, for example. Controller 704 can be configured to control the assignment and mapping of the button layout to each button input area region of input device 130. In the process illustrated in FIG. 7, orientation detector 702 detects (step 700) a change in orientation of electronic device 100. In response, orientation detector 702 can provide (step 710) a signal to controller 704 identifying a new device orientation. Upon receiving this signal, controller 704 can change (step 720) the button layout of each button input area region based on the received orientation information, for example, in a manner described in the illustrated embodiments above.

The example of FIG. 8 illustrates a process in which electronic device 100 utilizes orientation detector 702, controller 704 and processor 802 to effect a change in the display and operation of an input device. In the process illustrated in FIG. 8, orientation detector 702 detects (step 800) a change in orientation of electronic device 100. In response, orientation detector 702 can provide (step 810) a signal to processor 802 identifying a new device orientation. Processor 802 can make a determination (step 820) as to whether the change in orientation should cause a change in the button layout of any button input area region such as Locations A-D illustrated in FIG. 1. If processor 802 determines that a change in button layout is warranted, processor 802 can provide (step 830) a signal to controller 704 identifying the button layout change that should be made. Upon receiving this signal, controller 704 can change (step 840) the button layout based on the received signal information. If processor 802 determines that a change in button layout is not warranted, no signal can be provided to controller 704 so that no button layout change is effected. By including processor 802 in the display process, application logic can be developed and loaded into electronic device 100 to direct processor 802 to either change or not change the button layout of the input area based on any dynamic factor, including application context for example.

The example of FIG. 9 illustrates a process in which electronic device 100 utilizes controller 704 and processor 802 to effect a change in the display and operation of an input device. In the process in FIG. 9, processor 802 may utilize any available information in determining (step 900) whether a button layout change is warranted. Such information can include a context of an application running on electronic device 100, for example. If processor 802 determines that a change in button layout is warranted, processor 802 can provide (step 910) a signal to controller 704 identifying the button layout change that should be made. Upon receiving this signal, controller 704 can change (step 920) the button layout based on the received signal information.

The illustrated process enables the development of applications that can rename or change a graphic and functionality associated with certain button input area regions, and associate application-specific functionality to button events associated with the button input area regions. This can enable a processor to coordinate the modification of icons and functionality associated with button input area regions of an input device.

In an example of one such application, a button layout associated with certain button input area regions can be programmed to change depending on choices provided in a user interface menu. For instance, a calendar application can be designed for electronic device 100 that causes a left and right button input area region to display month names, such as "Mar" and "May". When a user presses a particular month name on the input device, the calendar application can be configured to provide calendar information for the selected month in response to the user input. In another example, the controls can be programmed to change in connection with a context of a game running on electronic device 100. The context of an application running on electronic device 100 can be dependent on actions taken by a user.

Any suitable display technology can be utilized to provide the graphic features associated with the input device. Display technologies can include, for example, electronic ink, LED, and LCD technologies. The graphic features can be positioned near or over the input sensors with which they are associated. For example, in one embodiment the graphic features can be provided on the electronic device housing adjacent to the corresponding button input area regions of the input device. In another embodiment, the graphic features can be provided over the corresponding button input area regions of the input device, as shown in the embodiments illustrated above.

In some embodiments, the input device can integrate the graphic feature display technology with the input detection technology of the input device. The input device can include a circuit board, such as a flexible printed circuit board (also referred to as FPC or flex) or a typical printed circuit board, that can enable any type of input detection technology. As described above, the input detection technology can include movable and rigid sensor mechanisms for example. Further, the circuit board can enable the input detection functionality and also be a main constituent of the input area display nodes.

In one such embodiment, electronic ink can be deposited on conductive display pads that are formed on the circuit board in a pixelated pattern. In one example, electronic ink can comprise a material that changes colors (e.g., between black and white) based on the charge that is applied to the electronic ink material. By applying a voltage to a particular arrangement of display pad pixels covered by the electronic ink, the circuit board can change the graphic features displayed by the electronic ink. An electronic ink display may have a slow response time relative to that of the input sensors of the input device, but a relatively slower response time may not necessarily be problematic for an embodiment that merely requires a change from one static image to another static image. Electronic ink may be advantageous in that it can provide a crisp, detailed image on top of either a flexible or rigid circuit board for example.

Figure 10A:
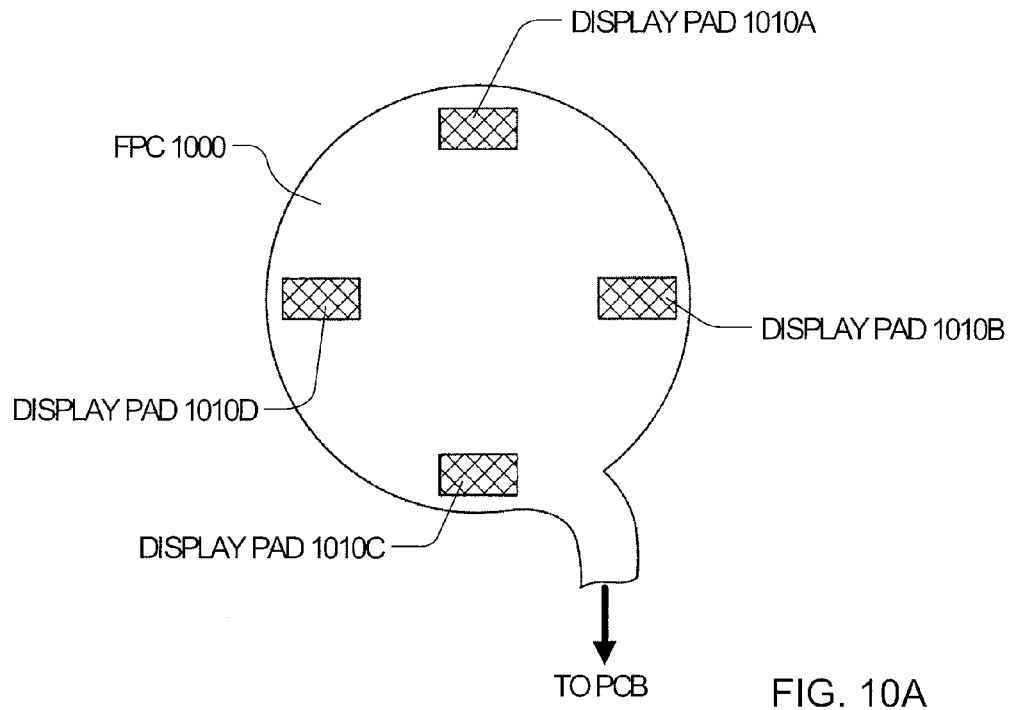
FIGS. 10A-10C illustrate examples of an input device.
Figure 10B:
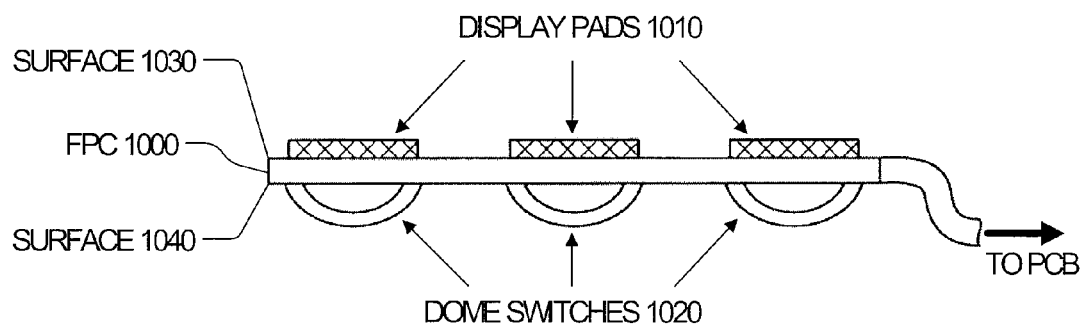
Figure 10C:
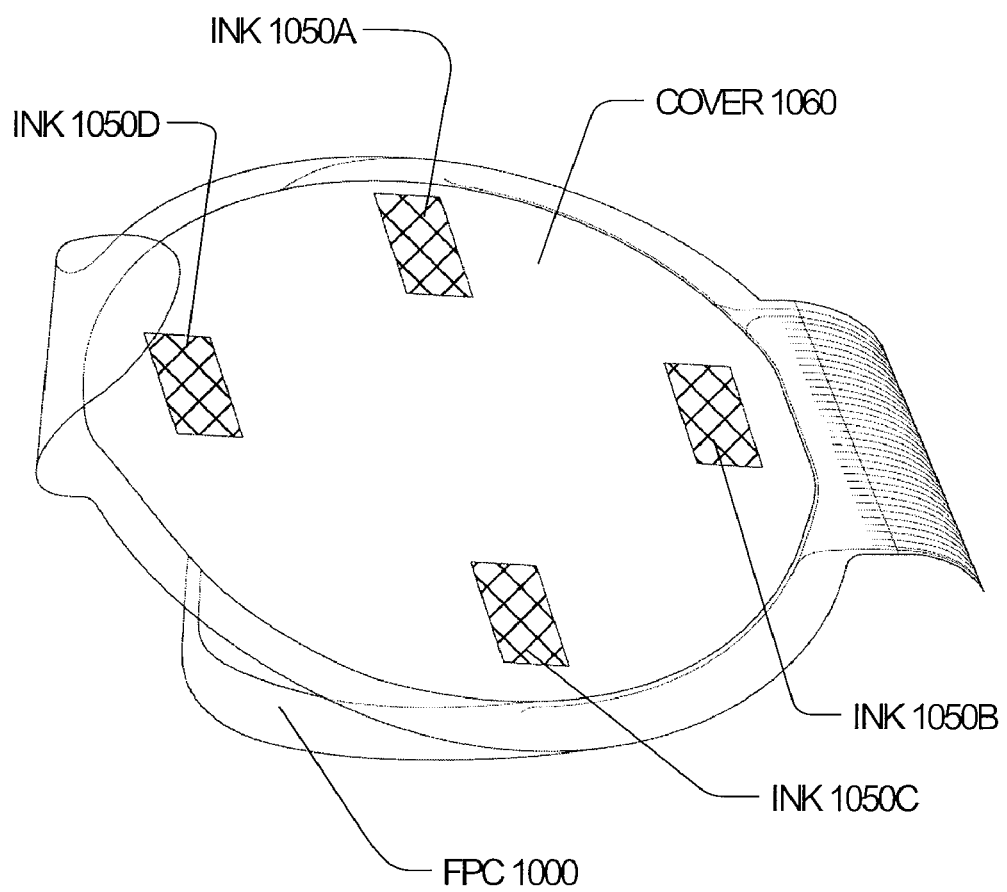

FIGS. 10A-10C illustrate an embodiment of an input device integrating display technology and movable button sensors on the same circuit board. FIG. 10A illustrates, in top view, FPC 1000 combined with four electronic ink display pads 1010A-1010D. Display pads 1010A-1010D, through which a voltage can be provided, comprise a conductive layer of the input device and can be laminated onto FPC 1000. Display pads 1010A-1010D can be made from a conductive material such as copper for example. In this embodiment, the locations of display pads 1010A-1010D correspond generally to Locations A-D of input device 130. FIG. 10B illustrates, in cross-sectional view, movable button sensors represented by dome switches 1020 located on surface 1040 of FPC 1000, and display pads 1010 located on opposite surface 1030 of FPC 1000. As illustrated in FIG. 10C, electronic ink material 1050 can be integrated with protective cover 1060 which is placed over FPC 1000. For illustration purposes, FIG. 10C depicts cover 1060 partially peeled back from its assembled position covering display pads 1010A-1010D on FPC 1000. Cover 1060 can be touchable by a user in the operation of the input device, and can be opaque in areas that are not covered with electronic ink 1050. Cover 1060 can be made of a plastic material and can be attached to FPC 1000 using an adhesive, for example, such that the display regions encompassed by electronic ink material 1050 is placed directly over display pads 1010 in the assembled position.

Also shown is a flexible connector that can connect FPC 1000 to a main printed circuit board (PCB) of the electronic device. Dome switches 1020 can be aligned with display pads 1010 on FPC 1000. Aligning dome switches 1020 and display pads 1010 in this manner can enable the graphic features controlled by each display pad 1010 to be properly associated with and mapped to its corresponding dome switch 1020.

In another embodiment, electronic ink 1050 can be printed directly on display pads 1010, and protective cover 1060 can be completely or partially transparent so that the graphic features displayed by electronic ink 1050 can be viewable by a user through cover 1060.

The conductive layer of FPC 1000 can also include sensor pads for capacitively sensing touch input. However, since the sensor pads cannot occupy the same area as the display pads, the ability of the input device to capacitively sense touch input may be relatively lower at locations where the display pads are placed. To compensate for this, the display pads may be placed in positions that least impact the sensing ability of the sensor pads. These positions may be widely varied. For example, in one embodiment, the display pads can be placed near the outer region of the FPC. In another embodiment, the display pads can be placed near the inner region of the FPC. The placement of the display pads need not be symmetrical, and can vary according to their desired functionality and impact on the operation of the input device.

Figure 11:
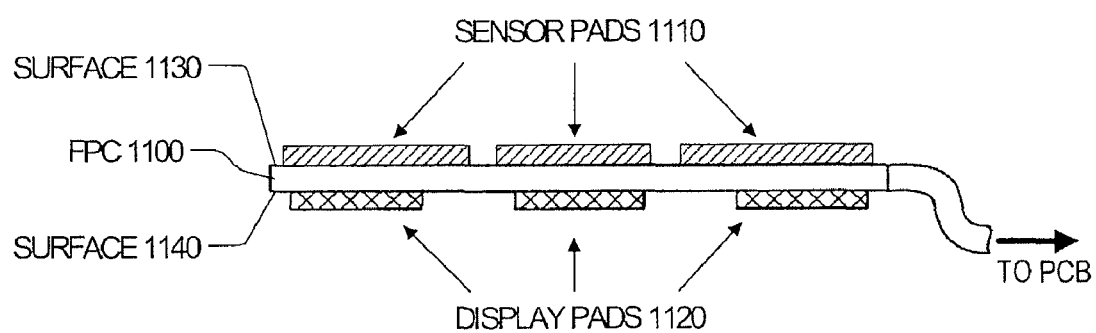
FIG. 11 illustrates an example of an input device.
Figure 11B:
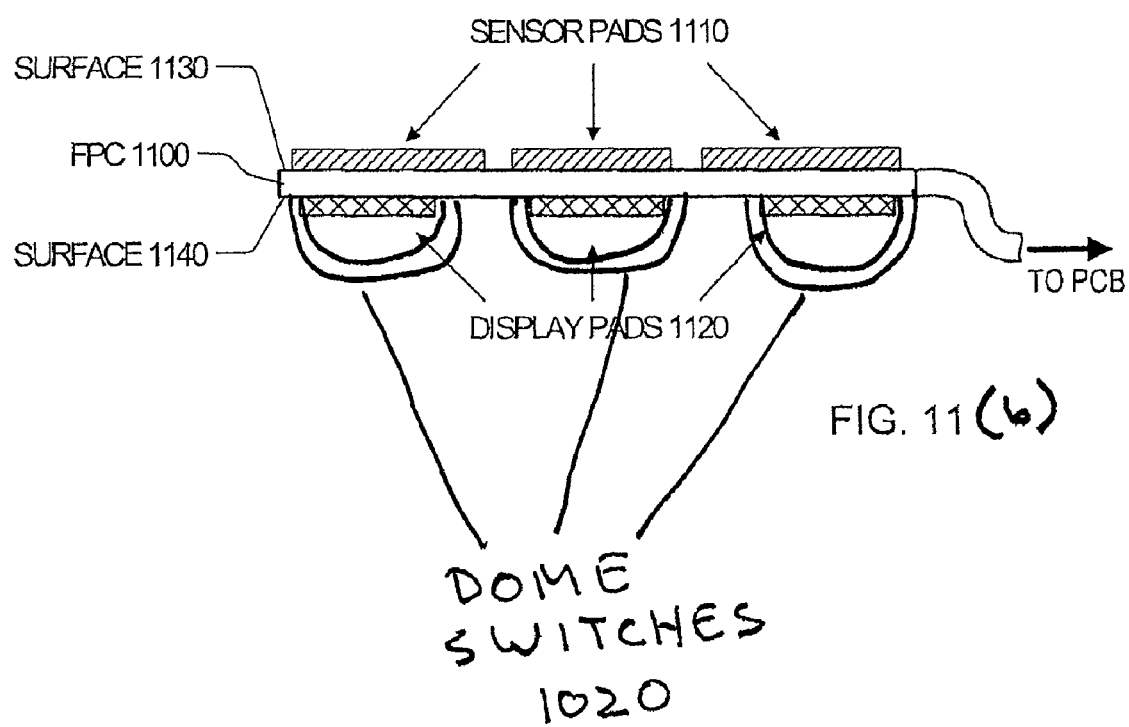

FIG. 11 illustrates an embodiment of an input device in which capacitive sensor pads can occupy the same area as display pads. In the illustrated embodiment, a conductive layer is laminated on each side of FPC 1100. The conductive layer from which capacitive sensor pads 1110 are formed is laminated to surface 1130. The conductive layer from which display pads 1120 are formed is laminated to surface 1140. Electronic ink material (not shown) can be applied directly to the underside of display pads 1120. This configuration can enable the entire flexible surface, or some portion thereof, of the FPC 1100 to function as a sensor and as input area display nodes. Although not shown, button sensors may be provided below the display conductive layer. In the embodiment illustrated in FIG. 11, FPC 1100 can be made of a transparent material such as a PET film, and the conductive layers can be made of a transparent conductive material such as indium tin oxide (ITO). This transparency can enable the display of graphic features controlled by display pads 1120 to be visible to a user through FPC 1100 and the capacitive sensing conductive layer.

Figure 12:
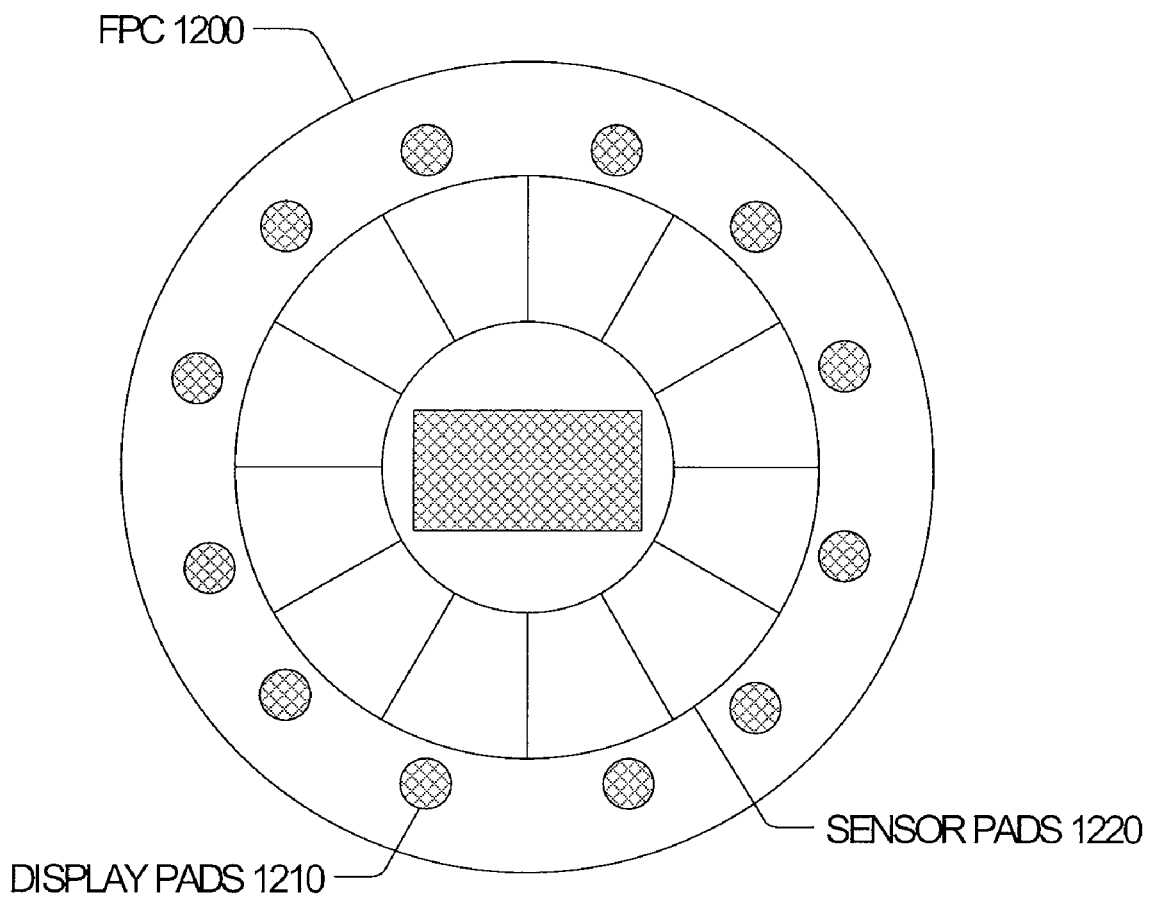
FIG. 12 illustrates an example of an input device.

However, utilizing two conductive layers can increase the relative height or thickness of the input device. The relative height or thickness of the input device may be lower in embodiments where the capacitive sensor pads and display pads are located on the same side of the flex. For example, FIG. 12 illustrates an embodiment of an input device in which capacitive sensor pads and display pads are located on the same side of the flex. In the embodiment illustrated in FIG. 12, capacitive sensor pads 1220 can be formed in a closed loop patter around the center of the flex, and displays pads 1210 can be formed in the center and around the outer perimeter of the flex.

Figures 13A, 13B:
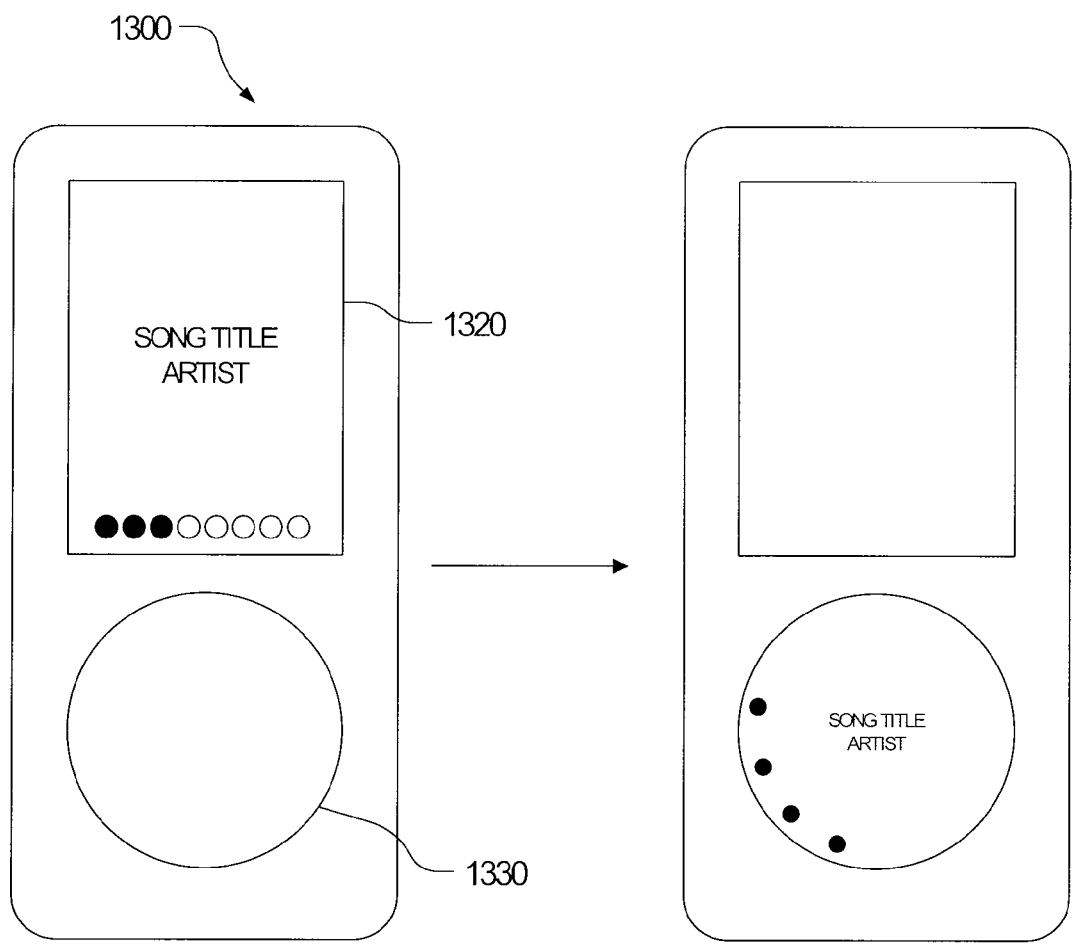
FIGS. 13A-13B illustrates an example of a dynamic input area display.

In addition to providing graphic features associated with button input area regions of the input device, the input device can also enable the display of other information on the surface of the input device. For example, FIGS. 13A and 13B illustrate an example of an electronic device that can include a dynamic input area display. Electronic device 1300 can include display screen 1320 (generally corresponding to display screen 120) and input device 1330 (generally corresponding to the input device illustrated in FIG. 12). In the embodiment illustrated in FIG. 13B, input device 1330 can display information such as a song title and artist associated with a media file being played by electronic device 1300. The display information can be displayed at certain times, such as when display screen 1320 is turned off, for example, as illustrated in FIGS. 13A and 13B. Input device 1300 can also display information such as a volume indicator around the periphery of the input device as illustrated in FIG. 13B. An example of a touchpad with symbols based on mode may be found in U.S. patent application Ser. No. 11/591,752 entitled "TOUCH PAD WITH SYMBOLS BASED ON MODE", filed Nov. 1, 2006, which is herein incorporated by reference.

In some embodiments the capacitive sensor pads and display pads can use at least some common signal wires. This may reduce the number wires emanating from a flex. In some embodiments multiplexing techniques can be used. This may also reduce the number wires emanating from a flex. Examples of capacitive sensing devices that reduce the number of I/O contacts associated with the devices may be found in U.S. patent application Ser. No. 11/483,008 entitled "CAPACITANCE SENSING ELECTRODE WITH INTEGRATED I/O MECHANISM", filed Jul. 6, 2006, and U.S. patent application Ser. No. 11/482,286 entitled "MUTUAL CAPACITANCE TOUCH SENSING DEVICE", filed Jul. 6, 2006, all of which are herein incorporated by reference.

As described above, an orientation detection sensor, such as an accelerometer, may be associated with the electronic device and can be located on a main circuit board or motherboard of the electronic device in one embodiment. The accelerometer can be used for detecting the orientation of the electronic device and generating a signal associated with the orientation of the electronic device or a change in orientation of the electronic device for example. The signal can be used to change the orientation of the display on the electronic device's display screen for example. The same or a similar accelerometer can be used to send a signal to the input device via a flex circuit board connection. The signal from the accelerometer can also be used for a feedback loop that may indicate which picture to use on the display screen. Similarly, the same information from the accelerometer can be used to indicate whether the input device and the electronic ink icons should use a first relative orientation or a second relative orientation. As the electronic device moves from a first device orientation to a second device orientation, the display screen can respond by changing from a first display mode to a second display mode.

Figure 14A:
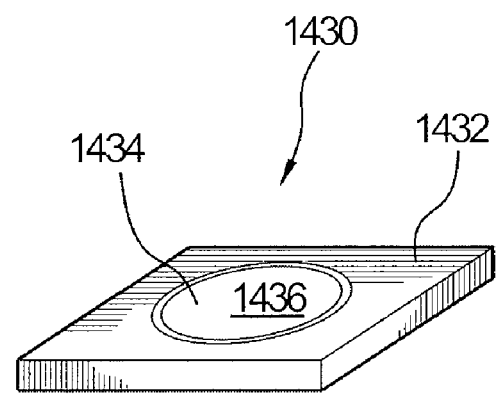
FIGS. 14A-14C illustrate examples of operations of an input device.
Figure 14B:
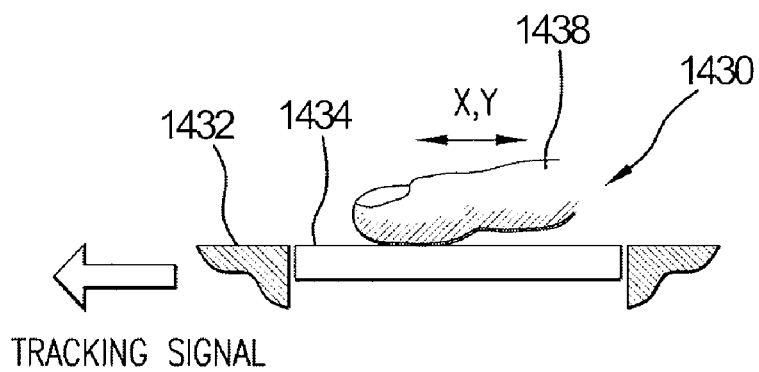
Figure 14C:
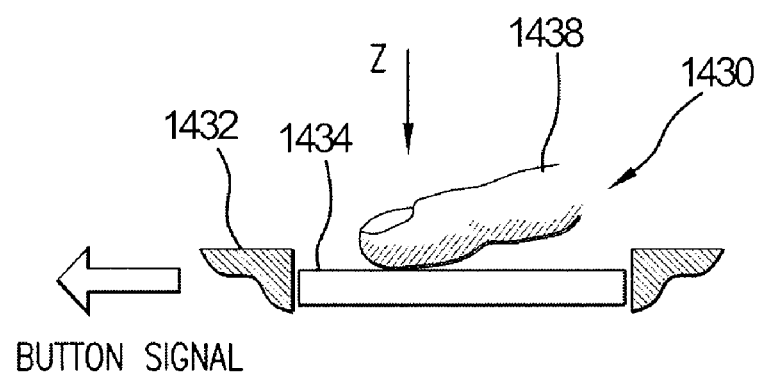

FIGS. 14A-14C illustrate operations of an input device according to some embodiments of the present disclosure. By way of example, the input device may generally correspond to any of the input devices mentioned above. In the example shown in FIG. 14A, input device 1430 can be configured to send information or data to an electronic device in order to perform an action on a display screen (e.g., via a graphical user interface). Examples of actions that may be performed include, moving an input pointer, making a selection, providing instructions, etc. The input device can interact with the electronic device through a wired connection (e.g., cable/connector) or a wireless connection (e.g., IR, Bluetooth, etc.). Input device 1430 may be a stand alone unit or it may be integrated into the electronic device. As a stand alone unit, the input device can have its own enclosure. When integrated into an electronic device, the input device can typically use the enclosure of the electronic device. In either case, the input device can be structurally coupled to the enclosure, as for example, through screws, snaps, retainers, adhesives and the like. In some cases, the input device may be removably coupled to the electronic device, as for example, through a docking station. The electronic device to which the input device may be coupled can correspond to any consumer related electronic product. By way of example, the electronic device can correspond to a computer such as a desktop computer, laptop computer or PDA, a media player such as a music player, a communication device such as a cellular phone, another input device such as a keyboard, and the like.

As shown in FIG. 14A, in this embodiment input device 1430 may include frame 1432 (or support structure) and touch pad 1434. Frame 1432 can provide a structure for supporting the components of the input device. Frame 1432 in the form of a housing can also enclose or contain the components of the input device. The components, which may include touch pad 1434, can correspond to electrical, optical and/or mechanical components for operating input device 1430. Frame 1432 may be a separate component or it may be an integral component of the housing of the electronic device.

Touch pad 1434 can provide location information for an object, such as a finger for example, in contact with or in proximity to the touch pad. This information can be used in combination with information provided by a movement indicator to generate a single command associated with the movement of the touch pad. The touch pad may be used as an input device by itself; for example, the touch pad may be used to scroll through a list of items on the device.

The shape, size and configuration of touch pad 1434 may be widely varied. In addition to the touchpad configurations disclosed above, a conventional touch pad based on the Cartesian coordinate system, or based on a Polar coordinate system can be configured to provide scrolling using rotational movements and can be configured to accept the multi-touch and gestures, for example those described herein. An example of a touch pad based on polar coordinates may be found in U.S. Pat. No. 7,046,230 which is incorporated by reference above. Furthermore, touch pad 1434 can be used in at least two different modes, which may be referred to as a relative mode and an absolute mode. In absolute mode, touch pad 1434 can, for example, report the absolute coordinates of the location at which it may be touched. For example, these would be "x" and "y" coordinates in the case of a standard Cartesian coordinate system or (r,θ) in the case of a Polar coordinate system. In relative mode, touch pad 1434 can report the direction and/or distance of change, for example, left/right, up/down, and the like. In most cases, the signals produced by touch pad 1434 can direct movement on the display screen in a direction similar to the direction of the finger as it may be moved across the surface of touch pad 1434.

Further examples of touch pad configurations may be found in U.S. patent application Ser. No. 10/949,060 entitled "Raw Data Track Pad Device and System," filed Sep. 24, 2004, U.S. patent application Ser. No. 11/203,692 entitled "Method of Increasing the Spatial Resolution of Touch Sensitive Devices," filed Aug. 15, 2005, and U.S. patent application Ser. No. 11/818,395 entitled "Touch Screen Stack-Ups," filed Jun. 13, 2007, all of which are incorporated herein by reference in their entireties.

Further examples of touch pad sensing may be found in U.S. patent application Ser. No. 10/903,964 entitled "Gestures for Touch Sensitive Input Devices," filed Jul. 30, 2004, U.S. patent application Ser. No. 11/038,590 entitled "Mode-Based Graphical User Interfaces for Touch Sensitive Input Devices," filed Jan. 18, 2005, U.S. patent application Ser. No. 11/048,264 entitled "Gestures for Touch Sensitive Input Devices," filed Jan. 31, 2005, U.S. patent application Ser. No. 11/232,299 entitled "System and Method for Processing Raw Data of Track Pad Device," filed Sep. 21, 2005, and U.S. patent application Ser. No. 11/619,464 entitled "Multi-Touch Input Discrimination," filed Jan. 3, 2007, all of which are incorporated herein by reference in their entireties.

The shape of touch pad 1434 may be widely varied. For example, it may be circular, oval, square, rectangular, triangular, and the like. In general, the outer perimeter can define the working boundary of touch pad 1434. In the embodiment illustrated in FIG. 14, the touch pad may be circular. Circular touch pads can allow a user to continuously swirl a finger in a free manner, i.e., the finger may be rotated through 360 degrees of rotation without stopping. This form of motion can produce incremental or accelerated scrolling through a list of songs being displayed on a display screen, for example. Furthermore, the user may rotate his or her finger tangentially from all sides, thus providing more finger position range. Both of these features may help when performing a scrolling function. Furthermore, the size of touch pad 1434 can accommodate manipulation by a user (e.g., the size of a finger tip or larger).

Touch pad 1434, which can generally take the form of a rigid platform. The rigid platform may be planar, convex or concave, and may include touchable outer surface 1436, which may be textured, for receiving a finger or other object for manipulation of the touch pad. Although not shown in FIG. 14A, beneath touchable outer surface 1436 can be a sensor arrangement that may be sensitive to such things as the pressure and movement of a finger thereon. The sensor arrangement may typically include a plurality of sensors that can be configured to activate as the finger sits on, taps on or passes over them. In the simplest case, an electrical signal can be produced each time the finger is positioned over a sensor. The number of signals in a given time frame may indicate location, direction, speed and acceleration of the finger on touch pad 1434, i.e., the more signals, the more the user moved his or her finger. In most cases, the signals can be monitored by an electronic interface that converts the number, combination and frequency of the signals into location, direction, speed and acceleration information. This information can then be used by the electronic device to perform the desired control function on the display screen. The sensor arrangement may be widely varied. By way of example, the sensors can be based on resistive sensing, surface acoustic wave sensing, pressure sensing (e.g., strain gauge), optical sensing, capacitive sensing and the like.

In the embodiment illustrated in FIG. 14, touch pad 1434 may be based on capacitive sensing. In most cases, the capacitive touch pad may include a protective shield, one or more electrode layers, a circuit board and associated electronics including an application specific integrated circuit (ASIC). The protective shield can be placed over the electrodes, the electrodes can be mounted on the top surface of the circuit board, and the ASIC can be mounted on the bottom surface of the circuit board. The protective shield may serve to protect the underlayers and to provide a surface for allowing a finger to slide thereon. The surface may generally be smooth so that the finger does not stick to it when moved. The protective shield also may provide an insulating layer between the finger and the electrode layers. The electrode layer may include a plurality of spatially distinct electrodes. Any suitable number of electrodes can be used. As the number of electrodes increases, the resolution of the touch pad also increases.

In accordance with one embodiment, touch pad 1434 can be movable relative to the frame 1432. This movement can be detected by a movement detector that generates another control signal. By way of example, touch pad 1434 in the form of the rigid planar platform can rotate, pivot, slide, translate, flex and/or the like relative to frame 1432. Touch pad 1434 can be coupled to frame 1432 and/or it can be movably restrained by frame 1432. By way of example, touch pad 1434 can be coupled to frame 1432 through axels, pin joints, slider joints, ball and socket joints, flexure joints, magnets, cushions and/or the like. Touch pad 1434 can also float within a space of the frame (e.g., gimbal). It should be noted that input device 1430 may additionally include a combination of joints such as a pivot/translating joint, pivot/flexure joint, pivot/ball and socket joint, translating/flexure joint, and the like to increase the range of movement (e.g., increase the degree of freedom).

When moved, touch pad 1434 can be configured to actuate a movement detector circuit that generates one or more signals. The circuit may generally include one or more movement detectors such as switches, sensors, encoders, and the like.

In the embodiment illustrated in FIG. 14, touch pad 1434 can be part of a depressible platform. The touch pad can operate as a button and perform one or more mechanical clicking actions. Multiple functions or the same function of the device may be accessed by depressing the touch pad 1434 in different locations. A movement detector signals that touch pad 1434 has been depressed, and touch pad 1434 signals a location on the platform that has been touched. By combining both the movement detector signals and touch pad signals, touch pad 1434 acts like multiple buttons such that depressing the touch pad at different locations corresponds to different buttons. As shown in FIGS. 14B and 14C, according to one embodiment touch pad 1434 can be capable of moving between an upright position (FIG. 14B) and a depressed position (FIG. 14C) when a requisite amount of force from finger 1438, palm, hand or other object is applied to touch pad 1434. Touch pad 1434 can be spring biased in the upright position, as for example through a spring member. Touch pad 1434 moves to the depressed position when the spring bias is overcome by an object pressing on touch pad 1434.

As shown in FIG. 14B, touch pad 1434 generates tracking signals when an object such as a user's finger is moved over the top surface of the touch pad in the x, y plane. As shown in FIG. 14C, in the depressed position (z direction), touch pad 1434 generates positional information and a movement indicator generates a signal indicating that touch pad 1434 has moved. The positional information and the movement indication can be combined to form a button command. Different button commands or the same button command can correspond to depressing touch pad 1434 in different locations. The different commands may be used for various functionalities including, but not limited to, making selections or issuing commands associated with operating an electronic device. By way of example, in the case of a music player, the button commands may be associated with opening a menu, playing a song, fast forwarding a song, seeking through a menu and the like.

To elaborate, touch pad 1434 can be configured to actuate a movement detector, which together with the touch pad positional information, can form a button command when touch pad 1434 is moved to the depressed position. The movement detector can be located within frame 1432 and coupled to touch pad 1434 and/or frame 1432. The movement detector may be any combination of switches and sensors. Switches can be generally configured to provide pulsed or binary data such as activate (on) or deactivate (off). By way of example, an underside portion of touch pad 1434 can be configured to contact or engage (and thus activate) a switch when the user presses on touch pad 1434. The sensors, on the other hand, can be generally configured to provide continuous or analog data. By way of example, the sensor can be configured to measure the position or the amount of tilt of touch pad 1434 relative to the frame when a user presses on the touch pad 1434. Any suitable mechanical, electrical and/or optical switch or sensor may be used. For example, tact switches, force sensitive resistors, pressure sensors, proximity sensors, and the like may be used. In some case, the spring bias for placing touch pad 1434 in the upright position may be provided by a movement detector that includes a spring action. In other embodiments, input device 1430 can include one or more movement detectors in various locations positioned under and/or above touch pad 1434 to form button commands associated with the particular locations in which the movement detector is actuated.

Touch pad 1434 may can also be configured to provide a force feedback response. An example of touch pad configuration providing a haptic feedback response may be found in U.S. Pat. No. 6,337,678 entitled "Force Feedback Computer Input and Output Device with Coordinated Haptic Elements," which is incorporated herein by reference in its entirety.

Figure 15:
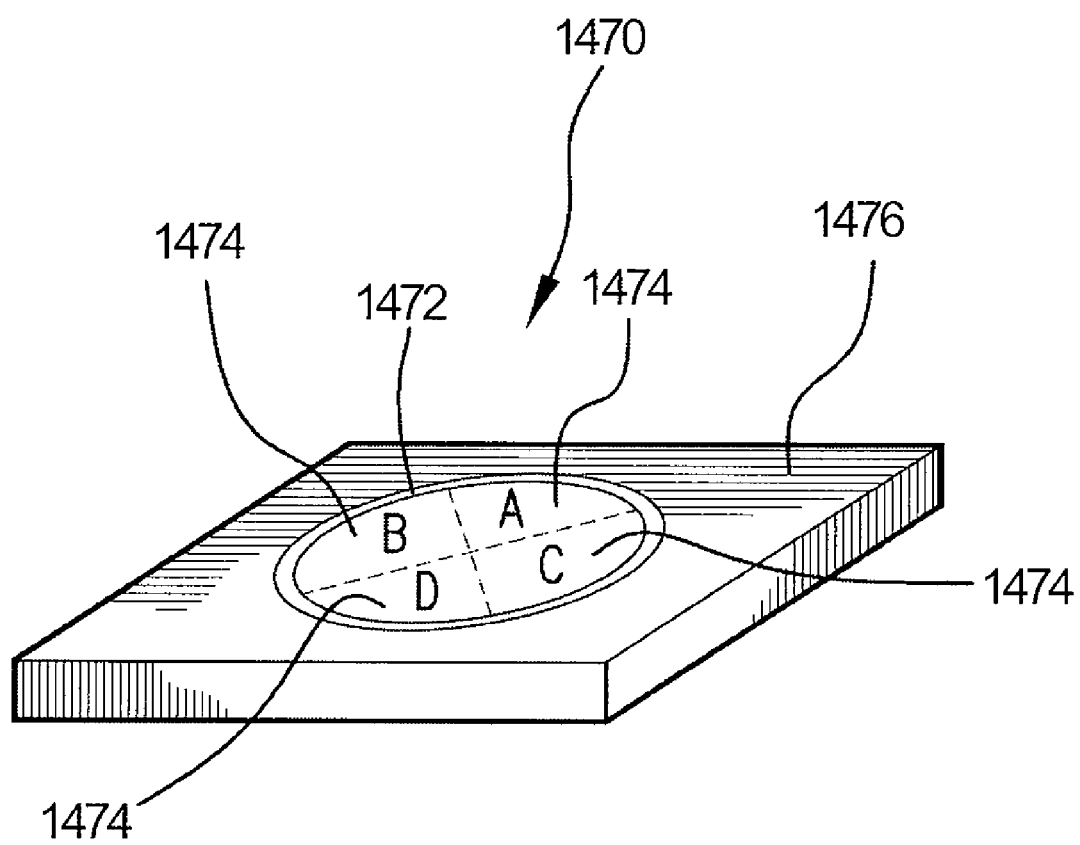
FIG. 15 illustrates an example of an input device.

FIG. 15 illustrates a simplified perspective diagram of input device 1470. Like the input device shown in the embodiment of FIGS. 14A-14C, this input device 1470 incorporates the functionality of one or more buttons directly into touch pad 1472, i.e., the touch pad acts like a button. In this embodiment, however, touch pad 1472 can be divided into a plurality of independent and spatially distinct button zones 1474. Button zones 1474 may represent regions of the touch pad 1472 that can be moved by a user to implement distinct button functions or the same button function. The dotted lines may represent areas of touch pad 1472 that make up an individual button zone. Any number of button zones may be used, for example, two or more, four, eight, etc. In the embodiment illustrated in FIG. 15, touch pad 1472 may include four button zones 1474 (i.e., zones A-D). These may, for example, correspond to Locations A-D described above.

As should be appreciated, the button functions generated by pressing on each button zone may include selecting an item on the screen, opening a file or document, executing instructions, starting a program, viewing a menu, and/or the like. The button functions may also include functions that make it easier to navigate through the electronic system, as for example, zoom, scroll, open different menus, home the input pointer, perform keyboard related actions such as enter, delete, insert, page up/down, and the like. In the case of a music player, one of the button zones may be used to access a menu on the display screen, a second button zone may be used to seek forward through a list of songs or fast forward through a currently playing song, a third button zone may be used to seek backwards through a list of songs or fast rearward through a currently playing song, and a fourth button zone may be used to pause or stop a song that may be in the process of being played.

To elaborate, touch pad 1472 can be capable of moving relative to frame 1476 so as to create a clicking action. Frame 1476 can be formed from a single component or a combination of assembled components. The clicking action can actuate a movement detector contained inside frame 1476. The movement detector can be configured to sense movements of the button zones during the clicking action and to send a signal corresponding to the movement to the electronic device. By way of example, the movement detectors may be switches, sensors and/or the like.

In addition, touch pad 1472 can be configured to send positional information on what button zone may be acted on when the clicking action occurs. The positional information can allow the device to determine which button zone to activate when the touch pad is moved relative to the frame.

The movements of each of button zones 1474 may be provided by various rotations, pivots, translations, flexes and the like. In one embodiment, touch pad 1472 can be configured to gimbal relative to frame 1476. By gimbal, it is generally meant that the touch pad 1472 can float in space relative to frame 1476 while still being constrained thereto. The gimbal can allow the touch pad 1472 to move in single or multiple degrees of freedom (DOF) relative to the housing, for example, movements in the x, y and/or z directions and/or rotations about the x, y, and/or z axes (θxθyθz).

Figure 16:
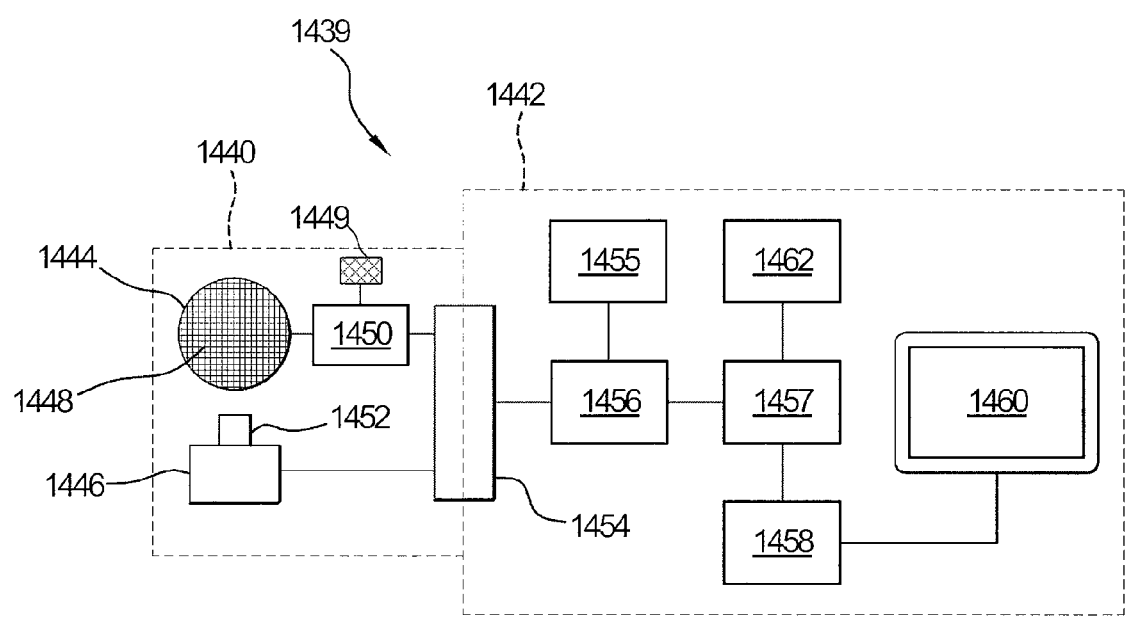
FIG. 16 illustrates an example of a computing system.

FIG. 16 illustrates an example of a simplified block diagram of a computing system 1439. The computing system may generally include input device 1440 operatively connected to computing device 1442. By way of example, input device 1440 can generally correspond to input device 1430 shown in FIGS. 14A-14C, and the computing device 1442 can correspond to a computer, PDA, media player or the like. As shown, input device 1440 may include depressible touch pad 1444, one or more movement detectors 1446 and one or more display nodes 1449. Touch pad 1444 can be configured to generate tracking signals and movement detector 1446 can be configured to generate a movement signal when the touch pad is depressed. Although touch pad 1444 may be widely varied, in this embodiment, touch pad 1444 can include capacitance sensors 1448 and control system 1450 for acquiring position signals from sensors 1448 and supplying the signals to computing device 1442. Control system 1450 can include an application specific integrated circuit (ASIC) that can be configured to monitor the signals from sensors 1448, to compute the absolute location, angular location, direction, speed and/or acceleration of the monitored signals and to report this information to a processor of computing device 1442. Movement detector 1446 may also be widely varied. In this embodiment, however, movement detector 1446 can take the form of a switch that generates a movement signal when touch pad 1444 is depressed. Movement detector 1446 can correspond to a mechanical, electrical or optical style switch. In one particular implementation, movement detector 1446 can be a mechanical style switch that includes protruding actuator 1452 that may be pushed by touch pad 1444 to generate the movement signal. By way of example, the switch may be a tact or dome switch. Display nodes 1449 may also be widely varied. Display nodes 1449 can be controlled by control system 1450, and may include any graphic feature display technology as described above, such as electronic ink for example.

Both touch pad 1444 and movement detector 1446 can be operatively coupled to computing device 1442 through communication interface 1454. The communication interface provides a connection point for direct or indirect connection between the input device and the electronic device. Communication interface 1454 may be wired (wires, cables, connectors) or wireless (e.g., transmitter/receiver).

Referring to computing device 1442, it may include processor 1457 (e.g., CPU or microprocessor) configured to execute instructions and to carry out operations associated with computing device 1442. For example, using instructions retrieved from memory, the processor can control the reception and manipulation of input and output data between components of computing device 1442. Processor 1457 can be configured to receive input from both movement detector 1446 and touch pad 1444 and can form a signal/command that may be dependent upon both of these inputs. In most cases, processor 1457 can execute instruction under the control of an operating system or other software. Processor 1457 may be a single-chip processor or may be implemented with multiple components.

Computing device 1442 may also include input/output (I/O) controller 1456 (which can generally correspond to controller 704) that can be operatively coupled to processor 1457. (I/O) controller 1456 can be integrated with processor 1457 or it may be a separate component as shown. I/O controller 1456 can generally be configured to control interactions with one or more I/O devices that may be coupled to the computing device 1442, as for example input device 1440 and orientation detector 1455 (which can generally correspond to orientation detector 702), such as an accelerometer. I/O controller 1456 can generally operate by exchanging data between computing device 1442 and I/O devices that desire to communicate with computing device 1442.

Computing device 1442 may also include display controller 1458 that can be operatively coupled to processor 1457 (which can generally correspond to processor 802). Display controller 1458 can be integrated with processor 1457 or it may be a separate component as shown. Display controller 1458 can be configured to process display commands to produce text and graphics on display screen 1460. By way of example, display screen 1460 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like. In the embodiment illustrated in FIG. 16, the display device corresponds to a liquid crystal display (LCD).

In some cases, processor 1457 together with an operating system operates to execute computer code and produce and use data. The computer code and data can reside within program storage area 1462 that may be operatively coupled to processor 1457. Program storage area 1462 can generally provide a place to hold data that may be used by computing device 1442. By way of example, the program storage area may include Read-Only Memory (ROM), Random-Access Memory (RAM), hard disk drive and/or the like. The computer code and data could also reside on a removable program medium and loaded or installed onto the computing device when needed. In one embodiment, program storage area 1462 can be configured to store information for controlling how the tracking and movement signals generated by the input device may be used, either alone or in combination for example, by computing device 1442 to generate an input event command, such as a single button press for example.

Figure 17A:
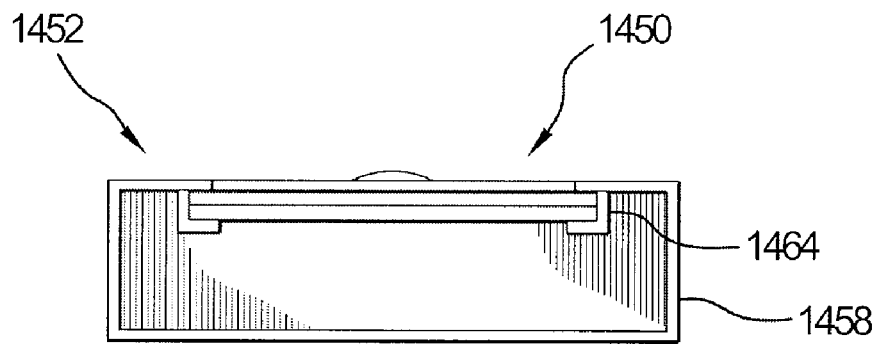
FIGS. 17A-17B illustrate an example of an installation of an input device into a media player.
Figure 17B:
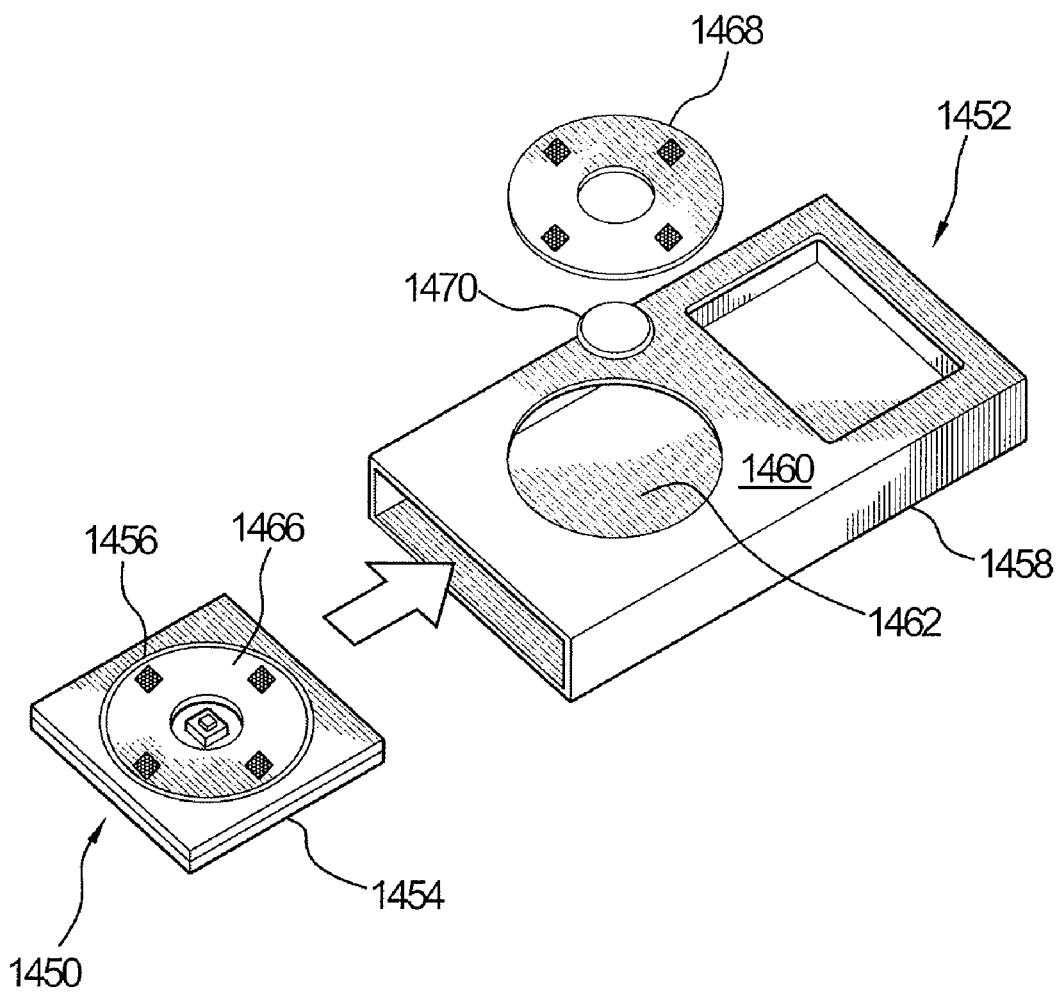

FIGS. 17A and 17B illustrate installation of an input device into a media player according to some embodiments of the present disclosure. By way of example, input device 1450 may correspond to any of those previously described and media player 1452 may correspond to the one shown in FIG. 17A. As shown, input device 1450 may include housing 1454 and touch pad assembly 1456. Media player 1452 may include shell or enclosure 1458. Front wall 1460 of shell 1458 may include opening 1462 for allowing access to touch pad assembly 1456 when input device 1450 is introduced into media player 1452. The inner side of front wall 1460 may include channel or track 1464 for receiving input device 1450 inside shell 1458 of media player 1452. Channel 1464 can be configured to receive the edges of housing 1454 of input device 1450 so that input device 1450 can be slid into its desired place within shell 1458. The shape of the channel can have a shape that generally coincides with the shape of housing 1454. During assembly, circuit board 1466 of touch pad assembly 1456 can be aligned with opening 1462 and cosmetic disc 1468 and button cap 1470 can be mounted onto the top side of circuit board 1466 for example. As shown in the embodiment illustrated in FIG. 17B, cosmetic disc 1468 can have a shape that may generally coincide with opening 1462. The input device can be held within the channel via a retaining mechanism such as screws, snaps, adhesives, press fit mechanisms, crush ribs and the like for example. In the embodiment illustrated FIG. 17B, touch pad assembly 1456 includes display pads corresponding to Locations A-D described above, and disc 1468 includes electronic ink deposited at button input area regions corresponding to Locations A-D. In an alternate embodiment in which electronic ink is deposited directly on the display pads, disc 1468 can include translucent or clear portions proximate to the display pads so that the displayed information can be viewed through the disc. In this alternate embodiment, the clear portions can include windows built into the disc or the disc can be entirely clear. In some cases, the clear portions may include a diffusion application to hide the existence of the display node. This may, for example, come in the form of a layer or texture, etc.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate processors or controllers may be performed by the same processors or controllers. Hence, references to specific functional units may be seen as references to suitable means for providing the described functionality rather than indicative of a strict logical or physical structure or organization.

The disclosure may be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in a plurality of units, or as part of other functional units. As such, the disclosure may be implemented in a single unit or may be physically and functionally distributed between different units and processors.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

What is claimed is:

1. An input device associated with a handheld device, comprising:
  a single flexible printed circuit comprising multiple button regions, each button region being associated with a dome switch,
  a button layout comprising a graphic feature formed with electronic ink, the graphic feature associated with each of the multiple button regions and configured to be dynamically moved and mapped to different mechanical button areas provided in fixed locations within the device,
  multiple capacitive sensor pads formed from a first conductive layer laminated to a first surface of the flexible printed circuit,
  multiple display pads formed from a second conductive layer laminated to a second surface of the flexible printed circuit,
  the first surface and the second surface being on opposite sides of the flexible printed circuit, wherein
  the handheld device is moveable between at least a first device orientation and a second device orientation,
  the button layout having an upright orientation relative to a user of the handheld device when the handheld device is oriented in the first device orientation, and
  the button layout relative to the handheld device changing to consistently maintain the upright orientation relative to the user as the handheld device is oriented in the second device orientation.

2. The input device of claim 1 wherein the graphic feature is smaller than the button region corresponding to the graphic feature.

3. The input device of claim 1 wherein the input area comprises a movable platform, the movements of which define the button regions.

4. The input device of claim 1 wherein each button region comprises a discrete graphic feature positioned over a discrete dome switch.

5. The input device of claim 1 comprising an accelerometer configured to provide at least one signal associated with the first device orientation and at least one signal associated with the second device orientation.

6. The input device of claim 1 wherein the multiple display pads are made from a conductive material, and the electronic ink is deposited on the multiple display pads in a pixelated pattern.

7. The input device of claim 1 further comprising a protective cover, wherein the multiple display pads are made from a conductive material, and the electronic ink is integrated with the protective cover and placed over the multiple display pads on the single flexible printed circuit.

8. The input device of claim 1 wherein the multiple capacitive sensor pads occupy the same area as the multiple display pads.

9. The input device of claim 1 wherein the electronic ink is applied to the display pads.

10. The input device of claim 1 wherein at least one of the flexible printed circuit, the first conductive layer and the second conductive layer comprises a transparent material.

11. The input device of claim 1 wherein at least one of the multiple capacitive sensor pads and the multiple display pads are configured to form a wheel.

12. An input device for a handheld device comprising:
  a single flexible printed circuit comprising an input area and multiple discrete input regions,
  multiple capacitive sensor pads formed from a first conductive layer laminated to a first surface of the flexible printed circuit,
  multiple display pads formed from a second conductive layer laminated to a second surface of the flexible printed circuit,
  the first surface and the second surface being on opposite sides of the flexible printed circuit, wherein
  each of the discrete input regions is associated with a dome switch configured to detect a button event,
  each of the discrete input regions is assigned a button function,
  each of the discrete input regions comprises a display node formed with electronic ink, configured to display graphical information associated with the assigned button function and configured to be dynamically moved and mapped to different mechanical button areas provided in fixed locations within the device, and
  the button function and associated graphical information shift within the input area in accordance with a change in the orientation of the handheld device and the button layout is consistently presented to the user in an upright orientation.

13. The input device of claim 12 wherein the display node is smaller than the input region corresponding to the display node.

14. The input device of claim 12 wherein the input area comprises a movable platform in, the movements of which define the input regions.

15. The input device of claim 12 wherein each input region comprises a discrete display node positioned over a discrete dome switch.

16. An input device associated with a handheld device, comprising:
  a single flexible printed circuit comprising multiple button regions, at least one of the multiple button regions being associated with a dome switch,
  a button layout comprising a graphic feature formed with electronic ink, the graphic feature associated with at least one of the multiple button regions and configured to be dynamically moved and mapped to different mechanical button areas provided in fixed locations within the device, multiple capacitive sensor pads formed from a first conductive layer laminated to a first surface of the flexible printed circuit, multiple display pads formed from a second conductive layer laminated to a second surface of the flexible printed circuit, the first surface and the second surface being on opposite sides of the flexible printed circuit, wherein the button layout and a user of the handheld device define a first relative orientation, the button layout and the handheld device define a second relative orientation, and the first relative orientation consistently remains substantially constant as the second relative orientation changes.

17. The input of claim 16 comprising an accelerometer configured to provide at least one signal associated with the second relative orientation.

18. An input device associated with a handheld device, comprising:
 a single flexible printed circuit comprising multiple button regions, each button region being associated with a dome switch,
 a button layout comprising icons formed with electronic ink, the icons associated with the multiple button regions and configured to be dynamically moved and mapped to different mechanical button areas provided in fixed locations within the device,
 multiple capacitive sensor pads formed from a first conductive layer laminated to a first surface of the flexible printed circuit,
 multiple display pads formed from a second conductive layer laminated to a second surface of the flexible printed circuit,
 the first surface and the second surface being on opposite sides of the flexible printed circuit, wherein
 the handheld device is moveable between at least a first device orientation and a second device orientation,
 the button layout having an upright orientation relative to a user of the handheld device when the handheld device is oriented in the first device orientation, and
 the button layout relative to the handheld device changing to consistently maintain the upright orientation of the icons relative to the user as the handheld device is oriented between the first device orientation and the second device orientation.

19. An input associated with a handheld device, the input comprising:
 a flexible printed circuit comprising multiple button regions, each button region being associated with a switch,
 a button layout comprising a graphic feature formed with electronic ink, the graphic feature associated with each of the multiple button regions and configured to be dynamically moved and mapped to different mechanical button areas associated with the handheld device,
 multiple capacitive sensor pads formed from a first conductive layer laminated to a first surface of the flexible printed circuit,
 multiple display pads formed from a second conductive layer laminated to a second surface of the flexible printed circuit,
 the first and second surfaces being on opposing sides of the flexible printed circuit,
 the handheld device being moveable between at least a first device orientation and a second device orientation,
 the button layout having an upright orientation relative to a user of the handheld device when the handheld device is oriented in the first device orientation, and
 the button layout relative to the handheld device maintaining the upright orientation relative to the user as the handheld device moves toward the second device orientation.

20. An input for a handheld device, comprising:
 a flexible printed circuit comprising an input area and multiple discrete input regions,
 multiple capacitive sensor pads formed from a first conductive layer laminated to a first surface of the flexible printed circuit,
 multiple display pads formed from a second conductive layer laminated to a second surface of the flexible printed circuit,
 the first and second surfaces being on opposing sides of the flexible printed circuit, wherein
 each of the discrete input regions is associated with a switch configured to detect a button event,
 each of the discrete input regions is assigned a button function,
 each of the discrete input regions comprises a display node foamed with electronic ink, configured to display graphical information associated with the assigned button function and configured to be dynamically moved and mapped to different mechanical button areas provided in fixed locations within the device, wherein
 as the orientation of the handheld device changes the button function and associated graphical information shift within the input area so that the button layout is presented to the user in an upright orientation.

* * * * *